(12) United States Patent
Shiimoto et al.

(10) Patent No.: US 8,270,122 B2
(45) Date of Patent: Sep. 18, 2012

(54) MAGNETIC RECORDING AND REPRODUCING DEVICE INCLUDING A DIFFERENTIAL READ HEAD

(75) Inventors: Masato Shiimoto, Odawara (JP); Takeshi Nakagawa, Odawara (JP); Hiroyuki Katada, Odawara (JP); Naoto Ito, Fujisawa (JP); Kenichi Meguro, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 12/365,195

(22) Filed: Feb. 4, 2009

(65) Prior Publication Data
US 2009/0207531 A1  Aug. 20, 2009

(30) Foreign Application Priority Data
Feb. 14, 2008 (JP) ................................. 2008-033111

(51) Int. Cl.
*G11B 5/39* (2006.01)
(52) U.S. Cl. ........................................ 360/314; 360/317
(58) Field of Classification Search ........... 360/313–328
See application file for complete search history.

(56) References Cited

U.S. PATENT DOCUMENTS

| | | | |
|---|---|---|---|
| 5,701,222 A | 12/1997 | Gill et al. | |
| 6,469,873 B1 | 10/2002 | Maruyama et al. | |
| 6,643,103 B1 * | 11/2003 | Trindade | 360/314 |
| 6,667,861 B2 * | 12/2003 | Gill | 360/324.11 |
| 6,927,948 B2 * | 8/2005 | Gill | 360/314 |
| 7,242,556 B2 * | 7/2007 | Gill | 360/324.12 |
| 2003/0123198 A1 | 7/2003 | Sugawara et al. | |
| 2006/0203384 A1 | 9/2006 | Maruyama et al. | |

FOREIGN PATENT DOCUMENTS

| | | |
|---|---|---|
| JP | 2002-183915 | 6/2002 |
| JP | 2003-069109 | 3/2003 |
| JP | 2004-227749 | 8/2004 |

OTHER PUBLICATIONS

Office Action issued in Japanese Patent Application No. 2008-033111 on Mar. 13, 2012.

* cited by examiner

*Primary Examiner* — Allen Heinz
(74) *Attorney, Agent, or Firm* — Antonelli, Terry, Stout & Kraus, LLP.

(57) ABSTRACT

A magnetic recording read head is provided capable of achieving high reproduction output, resolution, and SNR, even at a high linear density. There is also provided a magnetic recording and reproducing device capable of achieving sufficient error bit rate. The magnetic recording read head includes a differential read head and a write head. The differential read head has a multilayer structure formed by laminating a first magnetoresistive sensor having a first free layer, a differential gap layer, and a second magnetoresistive sensor having a second free layer. Outside the multilayer structure, a pair of electrodes and a pair of magnetic shields are provided respectively. A ratio (Gl/bl) of an inside distance (Gl) between the first and second free layers to a bit length (bl) is set to 0.6 or more and 1.6 or less.

5 Claims, 19 Drawing Sheets

MAGNETIC RECORDING AND REPRODUCING DEVICE INCLUDING A DIFFERENTIAL READ HEAD

FIELD OF THE INVENTION

The present invention relates to a magnetic recording and reproducing head (magnetic recording read head) having a differential read head and a write head, and a magnetic recording and reproducing device on which the magnetic recording read head is mounted.

BACKGROUND OF THE INVENTION

Recently, the demand for high density recording has increased significantly in magnetic recording and reproducing devices, such as HDDs (Hard Disk Drives). The realization of high density recording is also necessary for magnetic heads and magnetic media to meet this demand. The magnetic recording and reproducing device includes a magnetoresistive head as a read sensor. This magnetoresistive head uses a structure called spin-valve, which employs the magnetoresistive effect of a multilayer film formed by laminating ferromagnetic metal layers with a nonmagnetic metal layer interposed therebetween. The magnetoresistive effect is a phenomenon in which the electrical resistance varies depending on the angle between the magnetizations of two ferromagnetic layers sandwiching a nonmagnetic intermediate layer. The spin-valve using the magnetoresistive effect has a structure of an anti-ferromagnetic layer/ferromagnetic layer/nonmagnetic intermediate layer/ferromagnetic layer. In this structure, the magnetization of the ferromagnetic layer contacting the anti-ferromagnetic layer is effectively fixed by an exchange coupling magnetic field generated in the interface between the anti-ferromagnetic layer and the ferromagnetic layer. At the same time, the magnetization of the other ferromagnetic layer is freely rotated by an external field, and thus an output is obtained. The ferromagnetic layer, whose magnetization is effectively fixed by the anti-ferromagnetic layer, is called pinned layer. The ferromagnetic layer, whose magnetization is rotated by the external field, is called free layer.

For the spin-valve employing the magnetoresistive effect, a CIP (Current In the Plane)-GMR (Giant Magneto-Resistive) head has been used to cause current to flow in the in-plane direction of the multilayer film. Today, CIP-GMR head is being replaced with TMR (Tunneling Magneto-Resistive) head and CPP (Current Perpendicular to the Plane)-GMR head to cause current to flow in the layer thickness direction of the multilayer film.

There are two major reasons for the replacement of the CIP-GMR head with the TRM head and CPP-GMR head. The first reason is that the TMR head and CPP-GMR head can increase the reproduction output more than the CIP-GMR head, thereby achieving high SNR (output/noise ratio). The second reason is that the CPP type causing the current to flow in the perpendicular direction of the multilayer film is more advantageous than the CIP type causing current to flow in the in-plane direction of the multilayer film, in terms of increasing the linear density. The linear density is the bit density in the circumferential direction of magnetic recording media. Incidentally, the bit density in the radius direction of the magnetic recording media is called the track density. The areal density of the magnetic recording and reproducing device increases by increasing both the linear density and the track density. The linear density can only be increased by increasing the resolution. The resolution indicates how high the reproduction output can be kept in high density recording, compared to in low density recording.

The existing magnetoresistive head has a configuration in which a magnetoresistive layer is sandwiched between a lower magnetic shield and an upper magnetic shield, which is a so-called shield-type read head. The resolution in the linear density direction is largely dependent on the magnetic shield gap (Gs). In other words, the smaller the magnetic shield gap is, the higher the resolution in the linear density direction is, and thus high areal density can be achieved. For the conventional CIP-GMR head, the magnetoresistive layer has had to be electrically isolated from the upper and lower magnetic shields, by interposing insulating layers between the upper and the lower magnetic shields, and the magnetoresistive layer, respectively. For this reason, it has been difficult to reduce the magnetic shield gap. On the other hand, for the TMR and CPP-GMR heads causing current to flow in the layer thickness direction of the multilayer film, there is no need to interpose the insulting layers between the upper and lower magnetic shields and the magnetoresistive layer, which is advantageous in reducing the magnetic shield gap. For this reason, the magnetoresistive head is shifting from the CIP-GMR head to the TMR and CPP-GMR heads, for increasing the output and resolution.

However, it is thought that it is difficult to reduce the layer thickness of the CPP type magnetoresistive layer to about 30 nm or less, and that the resolution increase will reach a limit in the near future. This is mainly due to the following two reasons. The first reason is that the layer thickness of the above magnetoresistive layer (anti-ferromagnetic layer/ferromagnetic layer/nonmagnetic intermediate layer/ferromagnetic layer) can be physically reduced to at most 30 nm. The second is that when the magnetic shield gap is about 30 nm or less, the media field applied to the read head rapidly decreases, and SNR rapidly decreases along with the reproduction output. When SNR decreases, the bit error rate (BER) does not increase even if a high resolution is obtained. The bit error rate, which is a bit signal error rate, indicates the total performance of the magnetic recording and reproducing device. In other words, it is difficult to achieve high areal density when the bit error rate is low. Due to these two reasons, the read head of the existing structure can only have a maximum magnetic shield gap of about 30 nm. This is a major impediment to increasing the areal density.

A so-called differential read head has been proposed as means for increasing the resolution in the linear density direction. In the longitudinal (in-plane) magnetic recording system, a signal field is generated only from the magnetization reversal area, with respect to the bit written in a magnetic recording media. While in a perpendicular magnetic recording system, a signal field is typically generated from each recorded bit. For this reason, the perpendicular magnetic recording system is suitable for the application of the differential read head. JP-A No. 183915/2002 discloses a read head structure in which two magnetoresistive layers are coupled in series via a conductive layer, thereby enabling to perform differential operation in a magnetic recoding and reproducing device using the perpendicular magnetic recording system. The pair of magnetoresistive layers is configured to have two free layers disposed adjacent to and facing each other via the conductive layer to serve as magnetic sensors for detecting signal fields, and to have the resistance change characteristics of opposite polarity to the magnetic field in one direction. Thus, the read head can perform differential operation. In this case, the resolution in the linear density direction is more influenced by the inside distance between the two free layers, than the magnetic shield gap. In other words, the resolution in the linear density direction is greatly influenced by the layer thickness of the conductive layer interposed between the pair of magnetoresistive layers. Thus, it is possible to obtain a high resolution in the liner density direction, by reducing the layer thickness of the conductive layer interposed between the pair of magnetoresistive layers, instead of reducing the magnetic shield gap. Further, JP-A No. 69109/2003 discloses a detailed structure of differential read head in which two free layers can have resistance change characteristics of opposite polarity to the magnetic field in one direction. Furthermore, JP-A No. 227749/2004 discloses a read head structure for achieving high resolution without providing the upper and lower magnetic shields.

In addition, the reproduction output of the differential read head is also thought to be increased. This is because if the maximum resistance change of one sensor is given by $\Delta R$, the resistance change of all the read sensors is expected to be $2 \times \Delta R$.

In order to clarify whether the magnetic recording and reproducing device including a differential read head has a potential of high linear density, a study has been made on the reproduction characteristics by numerical computation using micromagnetic simulation and by measurement of bit error rate. The ratio (Gl/bl) of the distance (Gl) between a first free layer and a second free layer, to the bit length (bl) is set to 0.5. The linear density of the magnetic recoding and reproducing device is set to 2000 kfci. Here, the bit length is the recording bit length which is the physical length of perpendicular recording media.

As a result of this study, it has been found that in the magnetic recording and reproducing device including the differential read head, the resolution is increased more than with the existing head, but the reproduction output is reduced much more than with the existing head. Also, in the magnetic recording and reproducing device including the differential read head, there arises a problem that the bit error rate is more degraded than with the exiting head. This is because the reproduction output decreases and SNR decreases. Thus, it has been newly found that the areal density is unlikely to increase even if the differential read head is simply mounted on the magnetic recording and reproducing device.

The reason why the reproduction output of the differential read head decreases more than that of the existing shield-type head, is that the output of the shield-type head is maximum when the free layer is near the center of the recording pattern, while the output of the differential read head is maximum when the two free layers are in the transition area of the recording pattern. Here, the recording pattern is the area in which the magnetization of the perpendicular recording media is in one direction. The transition area of the recording pattern typically has a transition width. Thus, the media field applied to the free layer is reduced to about 20% to 40%, compared to when the free layer is located near the center of the recording pattern. For this reason, the reproduction output of the differential read head is lower than that of the existing head.

SUMMARY OF THE INVENTION

It is desirable to provide a magnetic recording head including a differential read head capable of preventing the degradation of the reproduction output, and enabling high resolution and high SNR.

It is also desirable to provide a magnetic recording and reproducing device on which the above-described magnetic recording read head is mounted to achieve a better bit error rate and a high recording density.

The present invention is to solve the foregoing problems by providing a magnetic recording read head under the assumption of the perpendicular magnetic recording system. The magnetic recording read head includes a differential-operation type read head of a multilayer structure formed by laminating a first magnetoresistive sensor having a first free layer, a differential gap layer, and a second magnetoresistive sensor having a second free layer, as well as a write head. Further, a magnetic recording and reproducing device includes the above-described magnetic recording read head and perpendicular recording media.

For the first and second magnetoresistive sensors, spin-valve type magnetoresistive sensors having a multilayer structure of anti-ferromagnetic layer/pinned layer/nonmagnetic intermediate layer/free layer are used to constitute the differential read head of the magnetic recording read head. Here, the anti-ferromagnetic layer is a layer to which an exchange coupling bias is applied so as to effectively fix the magnetization of the pinned layer. The anti-ferromagnetic layer can be formed to directly contact the pinned layer, or to otherwise bring the effect indirectly through the magnetic coupling. It is also possible to use other bias application means, for example, the remnant magnetization of a hard magnetic layer or the current bias, in place of the anti-ferromagnetic layer.

The free layer may be formed as a synthetic-ferri free layer, in which two or more free layers, each having a different product of the layer thickness and the saturation magnetization, are coupled via an anti-parallel-coupling layer so that the magnetizations of the free layers are anti-parallel to each other. The pinned layer may be formed as a synthetic-ferri pinned layer, in which a first pinned layer and a second pinned layer are coupled via the anti-parallel-coupling layer so that the magnetizations of the first and second pinned layers are anti-parallel to each other. At this time, the coupling should be sufficiently large relative to the magnetic field to be detected. The specific size of the anti-parallel-coupling magnetic field is of the order of hundreds or thousands of oersteds. As a result, the magnetization of the second pinned layer is fixed to the magnetic field to be detected. The free layer changes the magnetization direction depending on the magnetic field to be detected. An output is generated by the relative angle between the magnetization of the free layer that changes the magnetization direction depending on the magnetic field to be detected, and the magnetization of the pinned layer fixed to the magnetization to be detected, or the second pinned layer of the synthetic-ferri pinned layer.

The differential gap layer may be a single layer or a multilayer structure of plural layers. Further, bias layers are provided to keep the free layers in a single domain state. It is desirable that the bias layers are high coercive force films having sufficiently large coercive force to the magnetic field to be detected, and are disposed adjacent to the respective end portions of the free layers in the track width direction. Further, a pair of electrodes is provided to cause current to flow in a direction approximately perpendicular to the film surface.

The write head should be structured to include a main pole and a return pole to apply a magnetic field in a direction perpendicular to a surface facing the media. A trailing shield and a leading shield may be provided in the main pole in the forward and backward directions of the magnetic head. Further, side shields may be provided on the both sides of the main pole in the track width direction. Furthermore, a waveguide and a light source may be provided in the vicinity of the main pole in order to irradiate the media.

In such a magnetic recording read head, the present invention also employs the following configuration to achieve high resolution, high reproduction output, and high SNR.

The ratio of the inside distance (Gl) between the two free layers to the bit length (bl) of the perpendicular recording media is set to 0.6 or more and 1.6 or less. In the present invention, the bit length is defined as the shortest bit length used for the magnetic recording and reproducing device. Further, the resolution is increased by providing a magnetic shield formed from a ferromagnetic metal having a high magnetic permeability on the outside of the multilayer structure of the read head.

With this configuration, it is possible to achieve high resolution and high reproduction output even at a high linear density. The resolution and the reproduction output can be further increased by setting the ratio of the inside distance between the two free layers to the bit length to 0.8 or more and 1.4 or less.

As described above, the magnetic recording and reproducing device according to the present invention includes the magnetic recording read head and the perpendicular recording media. The perpendicular recording media includes a perpendicular magnetization layer capable of magnetization perpendicular to the facing surface of the media. In this magnetic recording and reproducing device, a sufficient bit error rate (BER) can be obtained.

According to the present invention, a magnetic recording read head including a differential read head using two magnetoresistive sensors, can achieve high reproduction output, high resolution and high SNR by appropriately controlling the bit length and the inside distance between the two free layers. Further, because the magnetic recording read head is mounted on the magnetic recording and reproducing device, it can achieve a high linear density and a better bit error rate.

DETAILED DESCRIPTION OF THE PREFERRED EMBODIMENTS

Figure 1:
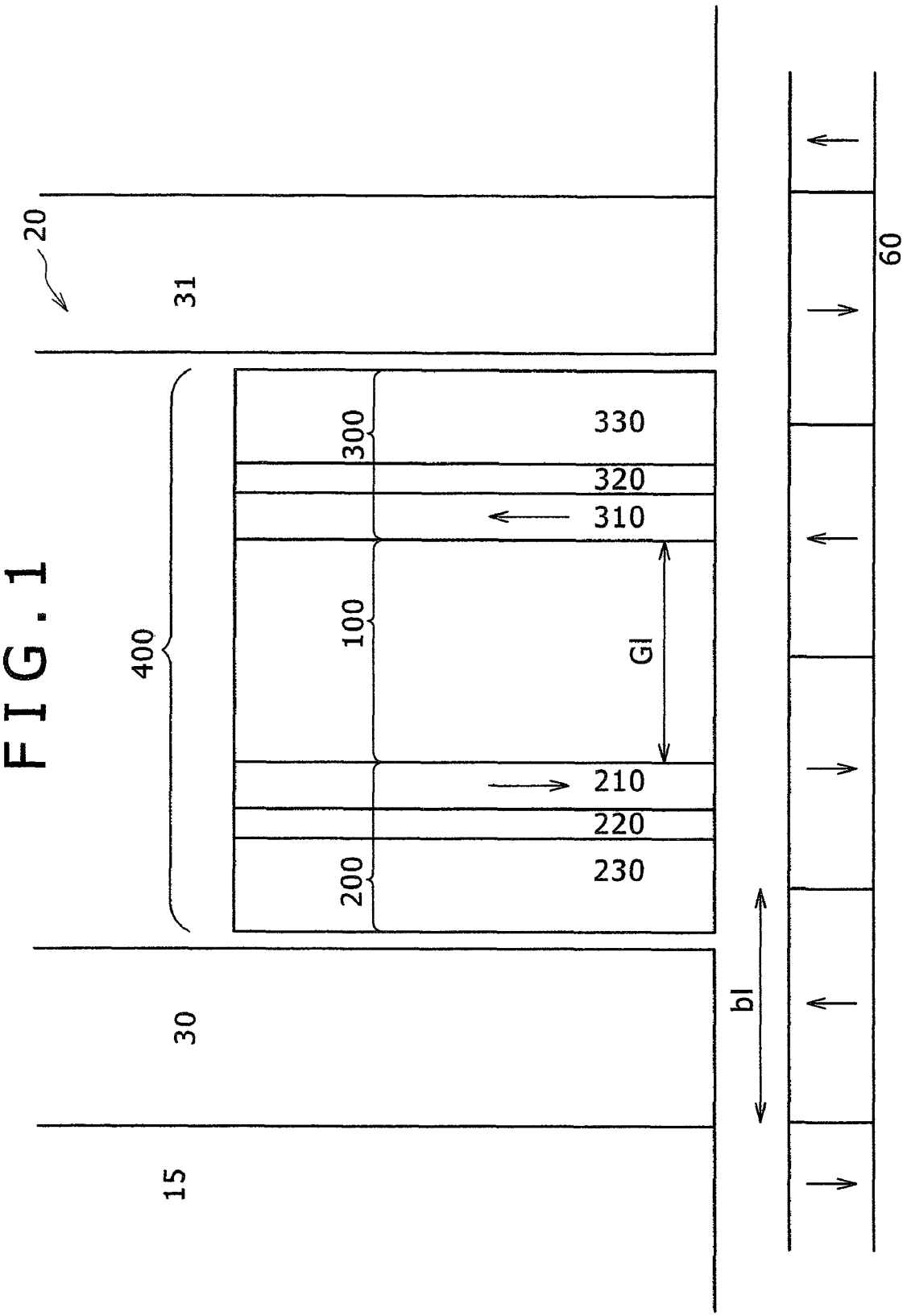
FIG. 1 is a schematic cross-sectional view of a differential read head and perpendicular recording media, according to a first embodiment.

Hereinafter, embodiments of the present invention will be described with reference to the accompanying drawings. The same reference numerals denote the parts having similar functions or the same functions throughout all the drawings for easy understanding.

First Embodiment

Figure 2:
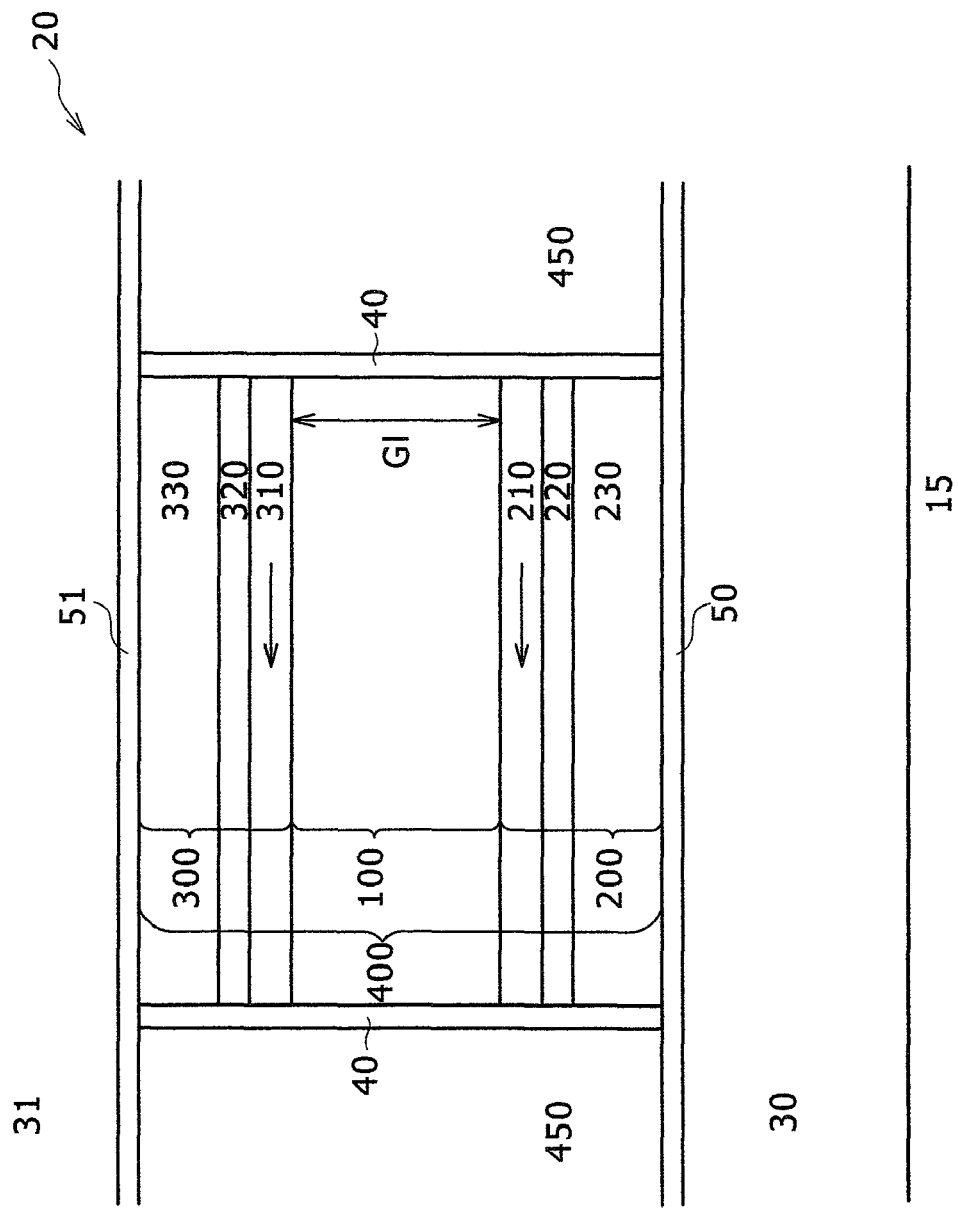
FIG. 2 is a schematic diagram of the differential read head according to the first embodiment, as seen from the ABS side.

FIG. 1 is a schematic cross-sectional view of a differential read head of a magnetic recording read head and an opposed perpendicular recording media, according to a first embodiment. FIG. 2 is a schematic diagram of the differential read head, as seen from the air bearing surface (ABS) side. Incidentally, the magnetization directions of respective ferromagnetic layers are indicated by arrows in the figures.

As shown in FIGS. 1 and 2, a differential read head 10 has a multilayer structure 400 in which a first magnetoresistive sensor 200, a differential gap layer 100, and a second magnetoresistive sensor 300 are laminated in this order from the side of a substrate 15. The first and second magnetoresistive sensors are configured so as to be able to obtain resistance changes of opposite phase to the magnetic field. In the read head 10, the first magnetoresistive sensor 200 and the second magnetoresistive sensor 300 respectively have a first free layer 210 and a second free layer 310. The distance between the first free layer 210 and the second free layer 310 is defined as Gl. For example, when the first free layer 210 and the second free layer 310 are brought into contact with the differential gap layer 100, Gl is equal to the layer thickness of the differential gap layer 100. As shown in FIG. 2, permanent magnetic layers 450 can be provided on the both sides of the first and second magnetoresistive sensor 200 and 300 in the track width direction, whereby the free layers are kept in a single domain state. A pair of electrodes can be provided on the outside of the two (upper and lower) magnetoresistive sensors, to cause current to flow in the direction perpendicular to the layer thickness. Of the two electrodes, one electrode close to the substrate 15 is referred to as a lower electrode 50, and the other electrode far from the substrate 15 is referred to as an upper electrode 51. It is also possible to use conductive ferromagnetic elements to function as both electrodes and magnetic shields, instead of providing the lower and upper electrodes as described above.

In FIG. 1, a recording layer (perpendicular magnetization layer) of the perpendicular recording media 60 is magnetized in the perpendicular direction to the ABS surface magnetically. The effect of the present invention is not impaired, as long as the recording media 60 satisfies the characteristics of being able to perform perpendicular recording, even if the configuration is different except for the above condition. For example, the perpendicular recording media 60 may be the so-called continuous media in which individual bits exist continuously, or may be the so-called discrete track media in which non-writable nonmagnetic areas are provided between plural tracks. It is also possible to use the so-called bit patterned media including convex magnetic patterns and non-magnetic elements for filling between the magnetic patterns on a substrate.

Figure 3:
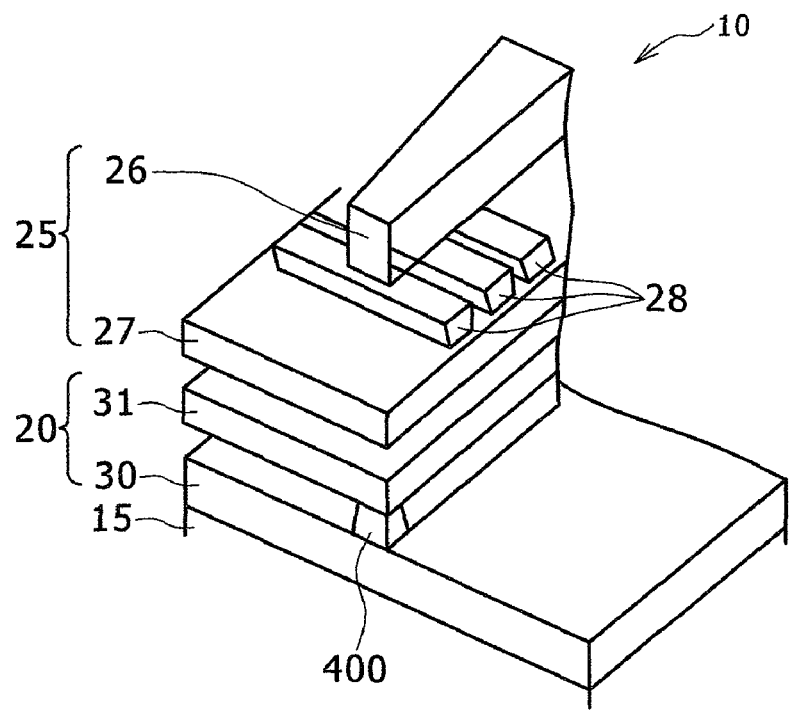
FIG. 3 is a perspective view showing an example of the configuration of the magnetic recording read head according to the first embodiment.

FIG. 3 is a perspective view showing the configuration of the magnetic recording read head 10 according to the first embodiment. As shown in FIG. 3, the magnetic recording read head 10 has a differential read head (a lower magnetic shield 30, a multilayer structure 400, and an upper magnetic shield 31) 20, and a read head (a main pole 26, a return pole 27, and coils 28) 25. The effect of the present invention will not be impaired, even if the perpendicular read head (read head) 25 is provided with a light source or other equivalent means to heat the shields and the perpendicular recording media 60 for helping magnetic recording. For example, it is possible to provide a trailing shield on the trailing side of the main pole 26, a leading shield on the leading side thereof, and side shields on the both sides thereof in the track width direction, respectively. Further, the trailing shield and the side shields can be connected together to serve as a wrap around shield. Furthermore, an optical probe having a light emission element and a waveguide can also be provided in the vicinity of the main pole 26, in order to heat the magnetic recording media 60.

Figure 4:
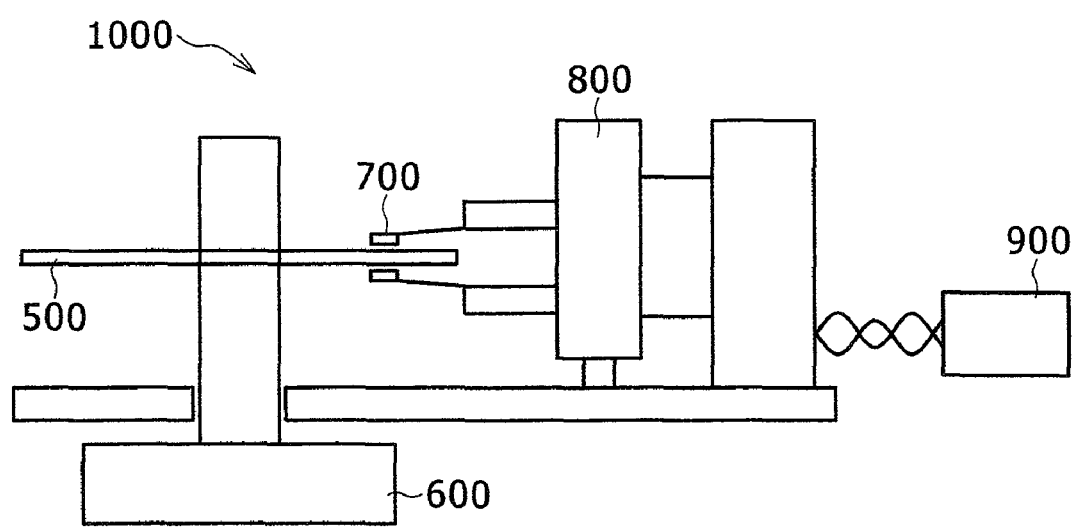
FIG. 4 is a schematic block diagram of a magnetic recording and reproducing device including the magnetic recording read head according to the first embodiment.

FIG. 4 schematically shows the confirmation of a magnetic recording and reproducing device (magnetic disk device) including the above-described magnetic recording read head 10. As shown in FIG. 4, a magnetic recording and reproducing device 1000 includes a disk 500 for holding the perpendicular recording media 60 on which information is magnetically recorded, a spindle motor 600 for rotating the disk 500, an actuator 800, and a head slider 700 that is guided onto the track of the disk 500 by the actuator 800. More specifically, in the magnetic recording and reproducing device 1000, the magnetic recording read head 10 of the first embodiment is formed on the head slider 700. The magnetic recording read head 10 approaches a predetermined recording position on the perpendicular recording media 60 to perform a relative movement by the head slider 700. In this way, the magnetic recording read head 10 sequentially writes and reads signals. The actuator 800 is preferably a rotary actuator or a micro actuator. It is designed to record a recording signal to the media by the read head through a signal processing system 900, and obtain the output of the differential read head 20 as a signal through the signal processing system 900. It is also possible to move the differential read head 20 onto a desired recording track, by detecting the corresponding position on the track by means of a sensitive output from the differential read head 20, and controlling the actuator 800 to determine the position of the head slider 700. FIG. 4 shows the case in which one head slider 700 and one disk 500 are provided. However, there is no problem with two or more of the head sliders 700 and two or more of the disks 500. Further, the disk 500 may have two perpendicular recording media 60 on the both sides thereof to record information. In the case of recording information on the both sides of the disk, the head slider 700 is provided on each side of the disk.

Figure 5:
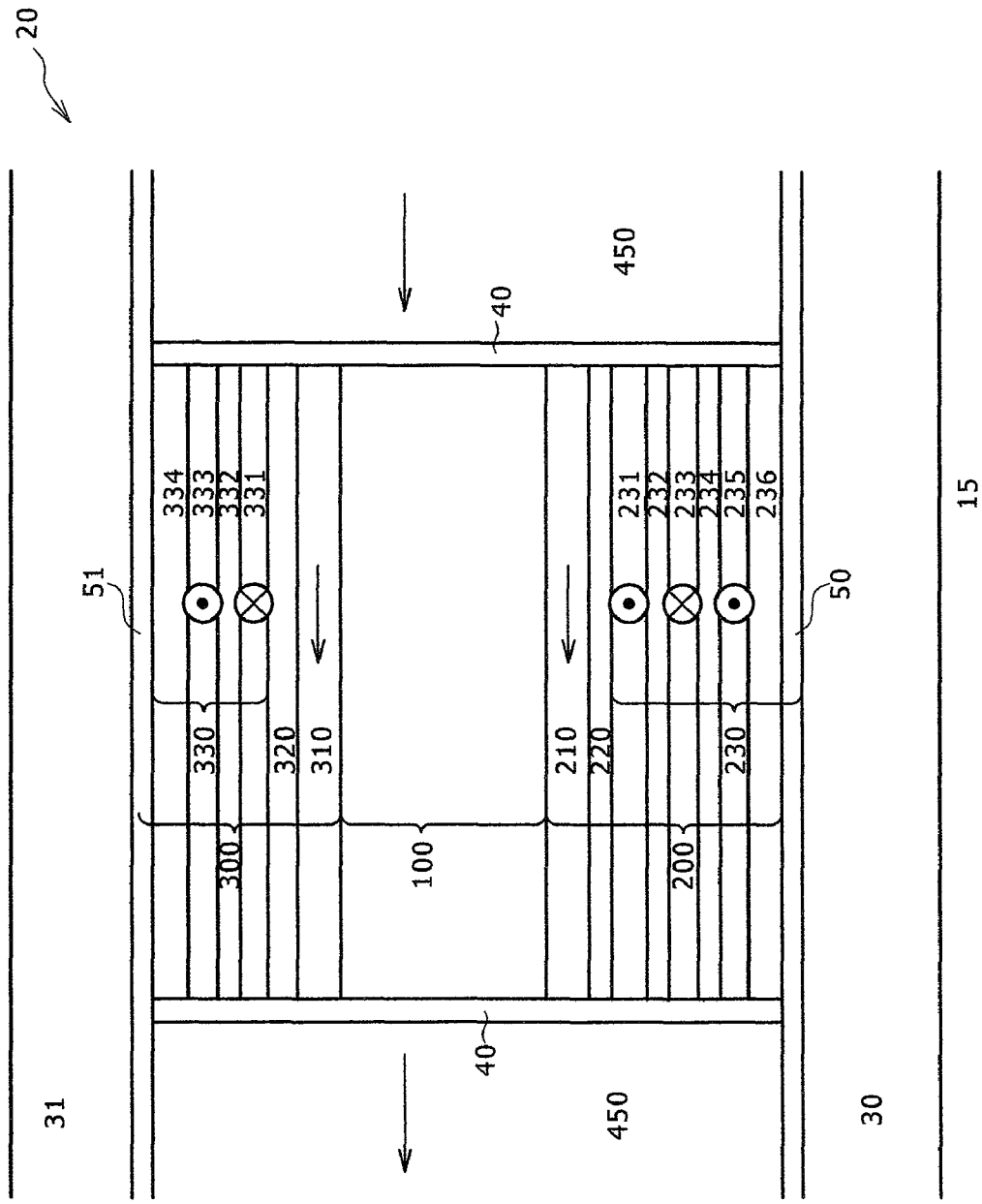
FIG. 5 is a detailed block diagram of the differential read head shown in FIG. 2.

FIG. 5 shows an example of the detailed configuration of the differential read head 20, as seen from the ABS side. The differential gap layer 100 may be a single layer or multilayer structure. The basic configuration of the first magnetoresistive layer 200 is a first pinned layer 230/first intermediate layer 220/first free layer 210 in this order from the side of the substrate 15. Of course, there is no problem if an appropriate foundation layer is formed in the bottom layer. Similarly, the basic configuration of the second magnetoresistive layer 300 is a second free layer 310/second intermediate layer 320/second pinned layer 330 in this order from the side near the differential gap layer 100. There is no problem if an appropriate protective layer is formed in the top layer.

The following is an example of the configuration of the first pinned layer 230 and the second pinned layer 330, in which the first magnetoresistive sensor 200 and the second magnetoresistive sensor 300 show resistance changes of opposite phase to the external magnetic field in one direction. The first pinned layer 230 is a multilayer film having a first anti-ferromagnetic layer 236, and a so-called synthetic-ferri structure in which m ferromagnetic layers (where m is an odd number) and m−1 anti-ferromagnetic interlayer coupling layers are alternately laminated. The second pinned layer 330 is a multilayer film having a second anti-ferromagnetic layer 334, and a synthetic-ferri structure in which n ferromagnetic layers (where n is an even number) and n−1 anti-ferromagnetic interlayer coupling layer are alternately laminated. In this way, the magnetizations of the ferromagnetic layers (the components of the first pinned layer 230 and the second pinned layer 330) respectively contacting the first anti-ferromagnetic layer 236 and the second anti-ferromagnetic layer 334, are fixed in one direction. At this time, the magnetizations of the ferromagnetic layers (the components of the first pinned layer 230 and the second pinned layer 330) respectively contacting the first intermediate layer 220 and the second intermediate layer 320, which effectively contribute to the magnetoresistive effect, are fixed in the anti-parallel direction. As a result, the first magnetoresistive layer 200 and the second magnetoresistive layer 300 show the resistance change characteristics of opposite phase to the signal field in one direction. The effect of the present invention will not be impaired if n is an odd number and m is an even number.

In this configuration example, high resolution and high reproduction output can be achieved by providing a pair of magnetic shields on the outside of the multilayer structure 400 of the differential read head 20, via a pair of electrodes 50 and 51. Of the two magnetic shields, one magnetic shield close to the substrate 15 is the lower magnetic shield 30, and the other magnetic shield far from the substrate 15 is the upper magnetic shield 31. Because the magnetic shields are provided, the resolution of the differential read head 20 can be further increased. The bit length (bl) and Gl of the magnetic recording and reproducing device are set so as to satisfy the relationship of the following equation (1).

$$0.6 < Gl/bl < 1.6 \quad (1)$$

Here, the bit length (bl) is the shortest recording pattern length used in the magnetic recording and reproducing device. In other words, the bit length (bl) is the length of the pattern at the highest linear density. In this configuration example, the pattern length is defined as the circumferential length of the perpendicular recording media in an area in which the magnetization directions of the perpendicular recording media are the same. In general, different recording pattern lengths of about one to ten times the bit length are synthesized to form a signal which is used in the magnetic recording and reproducing device.

Figure 6:
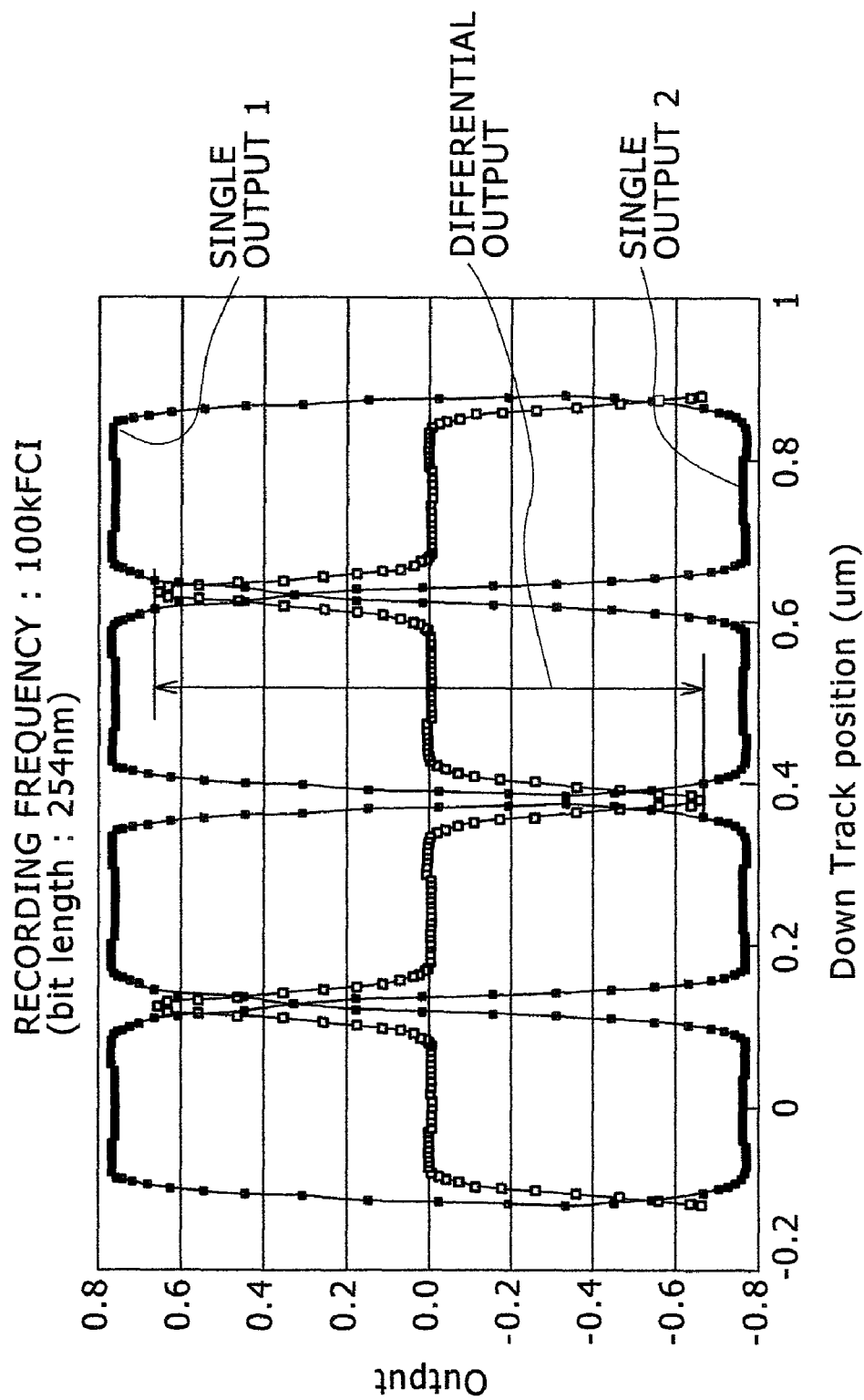
FIG. 6 is a graph comparing independent waveforms of a shield-type head and differential read heads.

FIG. 6 shows individual waveforms obtained by micromagnetic simulation, with respect to the single first magnetoresistive layer 200 in the differential read head 20, the single second magnetoresistive layer 300 in the differential read head 20, and the differential read head 20 including the first and second magnetoresistive layers 200, 300 that are coupled in series via the differential gap layer 100. As shown in the figure, the individual waveforms of a single output 1 of the first magnetoresistive layer 200 and a single output 2 of the second magnetoresistive layer 300 are rectangular reproduction waveforms specific to the perpendicular magnetic recording system. On the other hand, the individual waveform of the differential output of the differential read head 20 is a Lorentzian reproduction waveform having an output peak at the output change point (corresponding to the area in which the magnetization of the recording bit is reversed) which is found in the individual waveforms of the single first magnetoresistive layer 200 and the single second magnetoresistive layer 300. This is because the differential output of the differential read head 20 is based on the detection of individual signal fields by the two free layers, thereby resulting in a differential reproduction waveform.

Hereinafter, a description will be given of the effect obtained by appropriately controlling the ratio of the distance (Gl) between the first free layer 210 and the second free layer 310, to the bit length (bl) in the magnetic recording read head 10 according to the first embodiment.

Figure 7:
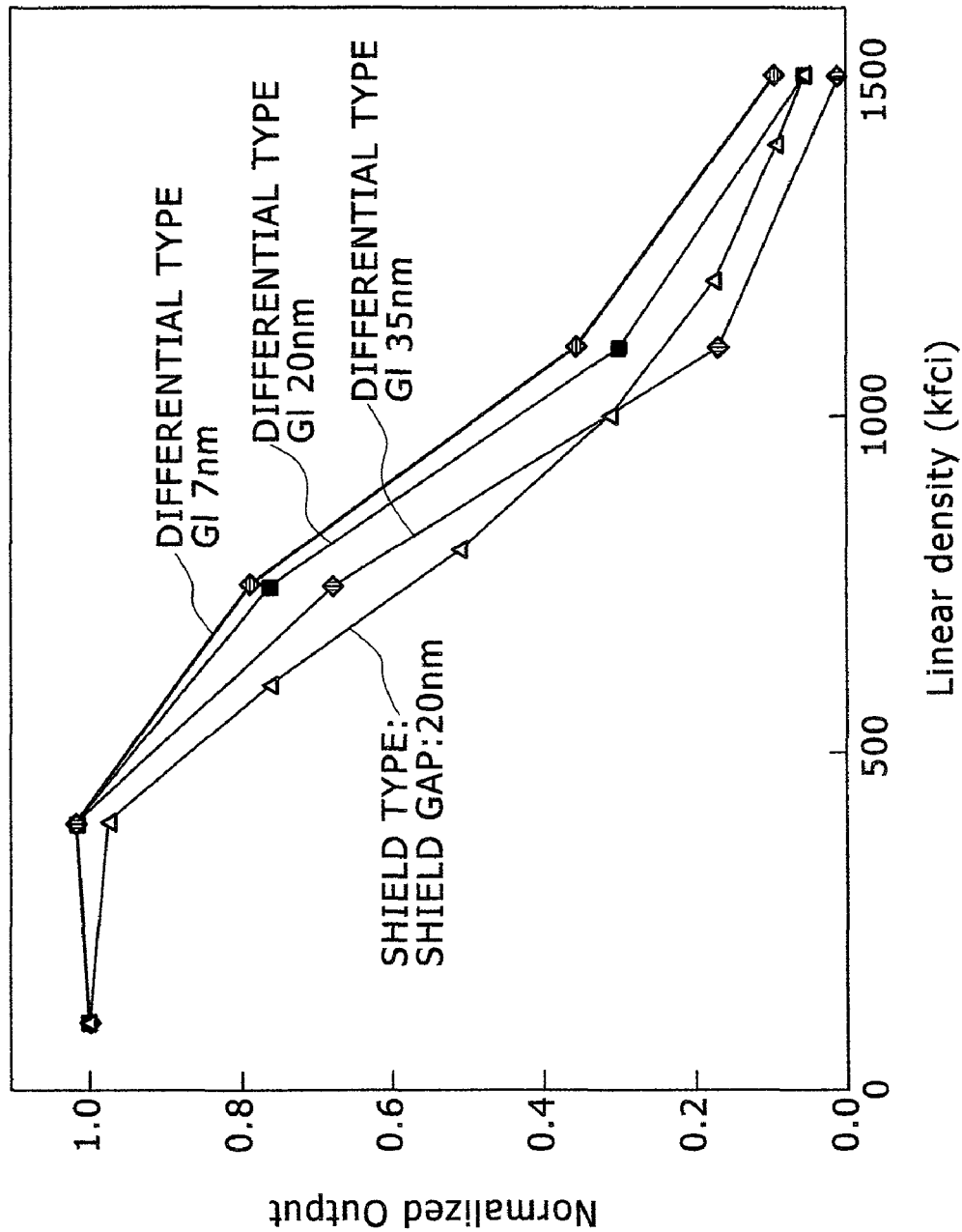
FIG. 7 is a graph comparing the linear density dependency of normalized output, between a shield-type head and differential read heads with different Gls.

FIG. 7 shows the calculation results of the linear density dependency of normalized output. The maximum linear density of the magnetic recording and reproducing device is set to 1500 kfci, and the bit length (bl) is set to 17 nm. The figure shows the comparison between a typical shield-type magnetoresistive head (using a single magnetoresistive layer), and the differential read head 20 according to the first embodiment shown in FIG. 5. The magnetic shield gap of the typical shield-type magnetoresistive head is 20 nm. The magnetic shield gap of the differential read head 20 is 60 nm, with the layer thickness of the differential gap layer 100 varying from 7 nm, 20 nm, and 35 nm. Here, the layer thickness of the differential gap layer 100 and Gl are equal to each other. In the present invention, it is necessary to satisfy equation (1), and Gl should be set to between 8.5 nm and 27 nm. Thus, the differential read head with Gl of 20 nm is only the structure according to the first embodiment.

Comparing the resolution between the differential read heads and the shield-type read head, it can be confirmed that the differential read heads with Gl of 7 nm and 20 nm show higher resolution than the shield-type read head. It is extremely difficult to set the magnetic shield gap to 20 nm in the shield-type magnetoresistive head. While in the differential read head, it is easy to set the layer thickness of the differential gap layer 100 to about 1 nm to 100 nm. For this reason, the differential read head can achieve higher resolution than the shield-type read head. Next, comparing the resolution of the differential read heads having different Gls, the resolution gets worse as Gl increases. Particularly, in the differential read head with Gl of 35 nm, the normalized reproduction output is lower than the output of the shield-type read head at 1000 kfci or more. This is because when Gl approaches the length of twice the bit length, the read head reads the signal field of a bit next to the bit in which the record should be originally reproduced. For this reason, in the differential read head with a large Gl at a high liner density, SNR decreases along with the output reduction. Thus, it is necessary to set the ratio between Gl and the bit length to a certain value or less.

Figure 8:
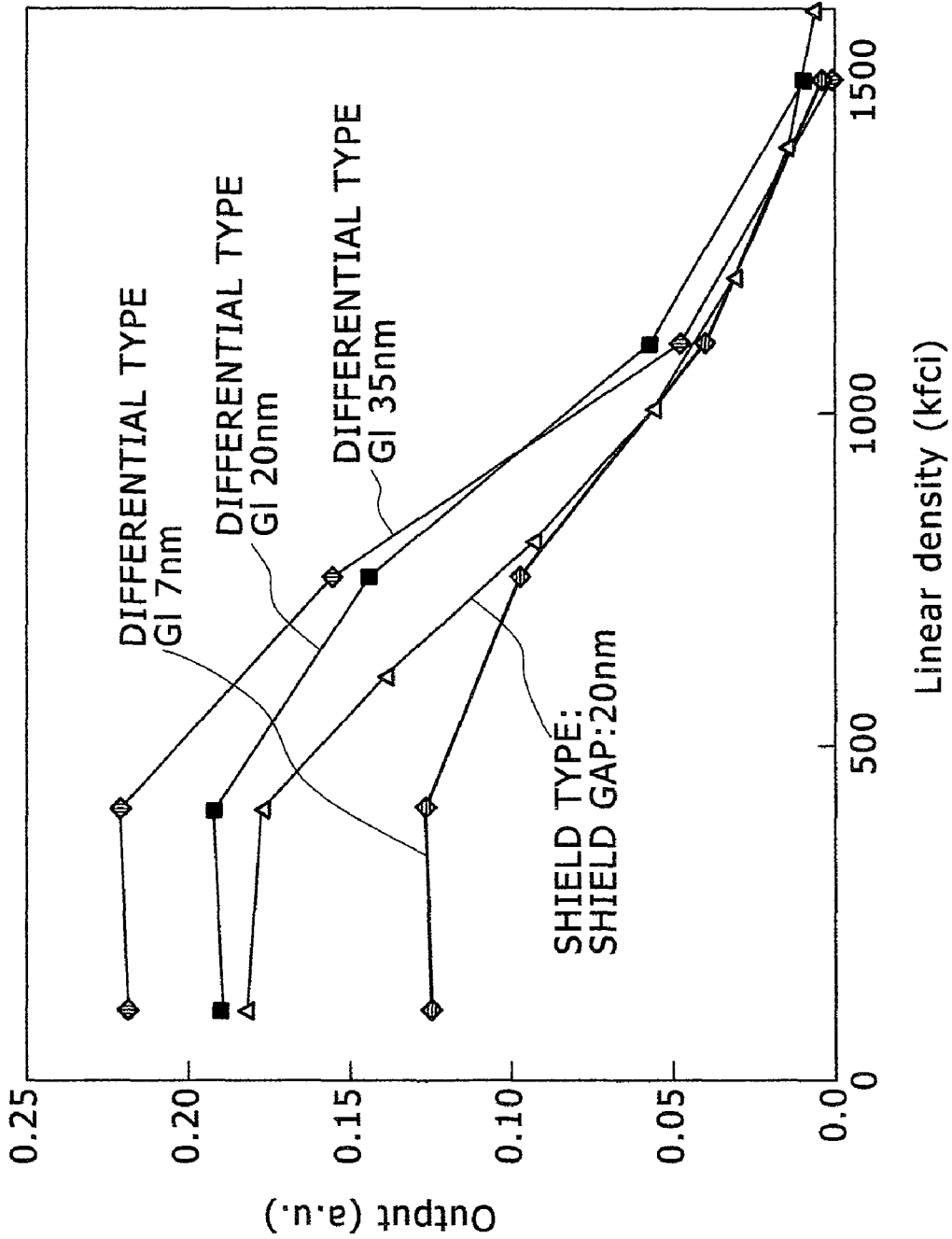
FIG. 8 is a graph comparing the linear density dependency of output, between a shield-type head and differential read heads with different Gls.

Next, FIG. 8 shows the linear density dependency of reproduction output. The conditions of the differential read heads as well as the linear density are the same as shown in FIG. 7. From the comparison between the reproduction outputs of the shield-type read head and the differential read heads, it has been found that the outputs of the differential read heads with Gl of 35 nm and 20 nm are larger than the output of the shield-type read head. However, the output of the differential read head with Gl of 7 nm is found to be much smaller than the output of the typical shield-type read head. This is because the smaller the value of Gl is, the smaller is the magnetic field applied to the free layers at the peak of the differential reproduction waveform. When the reproduction output is significantly reduced, SNR is also reduced, so that it is difficult to obtain a high bit error rate even at high resolution. Thus, Gl should be set to a certain value or more depending on the recording density, namely, depending on the bit length.

Figure 9:
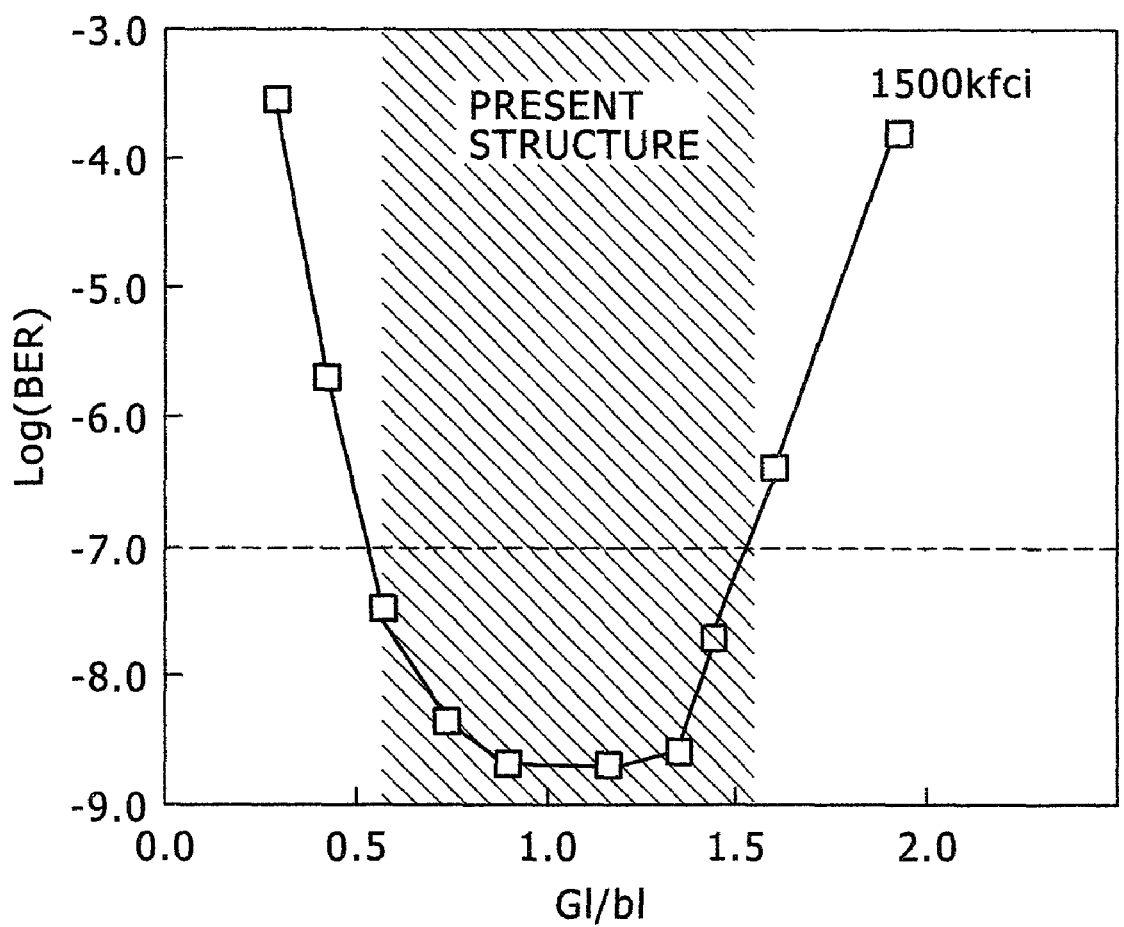
FIG. 9 is a graph showing the relationship between the bit error rate and the ratio of Gl to the bit length (bl) at a linear density of 1500 kfci.

The ratio between Gl and the bit length (bl), which is necessary to achieve a certain linear density, has been determined by measuring bit error rates (BERs) of the differential read heads with different Gls. Each bit error rate has been measured by generating a random pattern used for the actual magnetic recording and reproducing device from a differential waveform obtained by micromagnetic simulation, generating a reproduction waveform by a read/write channel commonly used for the magnetic recording and reproducing device, and counting the number of errors in the data area. The differential read heads used in this study have a track width and element height both equal to 50 nm, with a resistance value of 40 ohms and dR/R of 10%. The head noise takes into account the Johnson noise due to resistance, the system noise of an amplifier or other component, and the thermal magnetization fluctuation. FIG. 9 shows the relationship between the bit error rate (BER) and the ratio (Gl/bl) of Gl to the bit length (bl), in the magnetic recording and reproducing device including the differential read head 20 of the first embodiment. At this time, the linear density is 1500 kci, or a bit length is 17 nm. The dependency of the bit error rate on Gl/bl results in the relationship of an inverted U shape having the minimum value at a certain point of Gl/bl. This is because, as described above, the resolution is reduced and the bit error rate is degraded when Gl/bl is large, and the reproduction output is reduced and the bit error rate is degraded when Gl/bl is small. In general, the bit error rate of the magnetic recoding and reproducing device is expected to be $10^{-7}$ or less from the viewpoint of signal reliability. For this reason, in order to achieve the bit error rate of $10^{-7}$ or less, Gl/bl should be set to 0.5 or more and 1.6 or less. At the same time, the bit error rate of the shield-type read head has been measured to compare the structure between the first embodiment and the existing shield-type read head. The recording density is set to 1500 kfci. The magnetic shield gap of the shield-type read head is set to 30 nm. The track width and the element height are both set to 50 nm, with a resistance value of 40 ohms and dR/R of 10%. The obtained bit error rate of the shield-type read head is $10^{-6.0}$. As a result, due to provision of the differential read head 20 of the first embodiment, it is possible to achieve a better bit error rate than with the existing shield-type read head.

Figure 10:
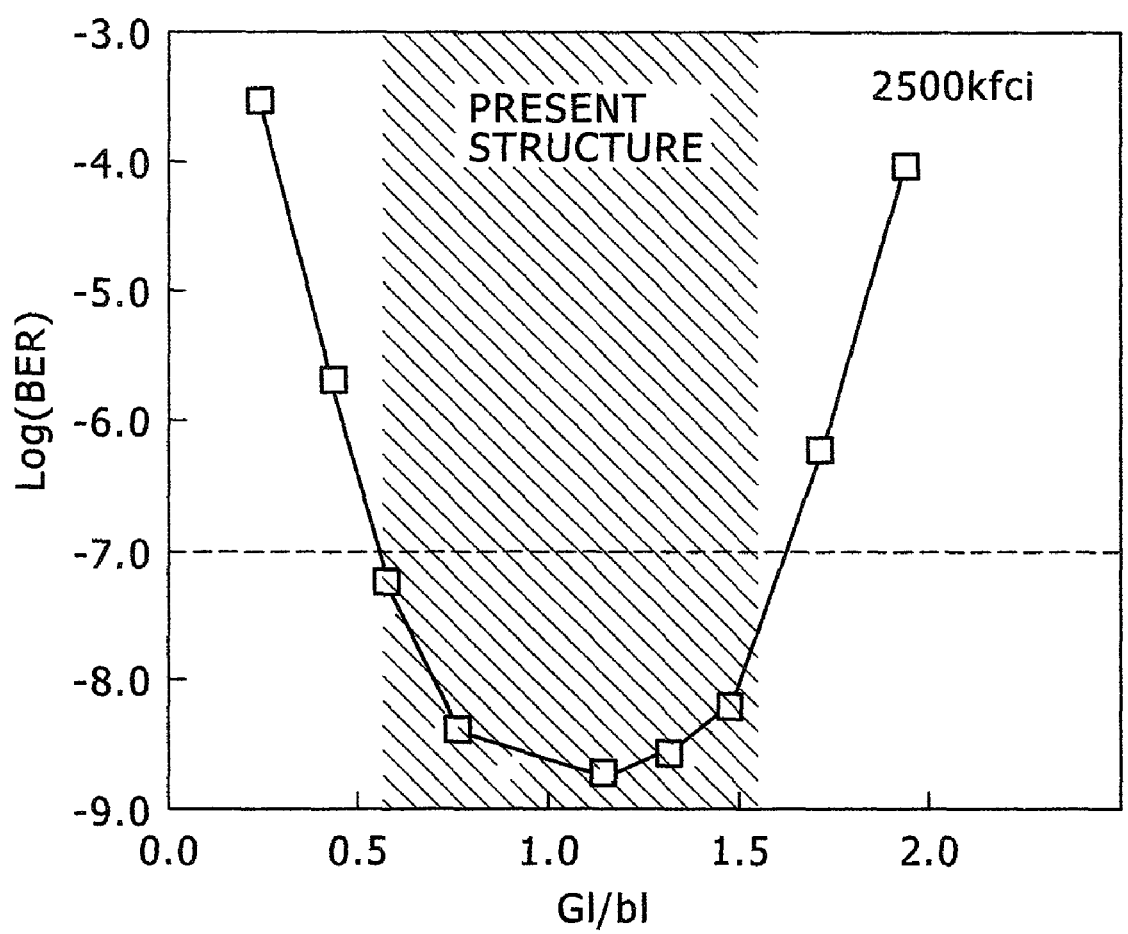
FIG. 10 is a graph showing the relationship between the bit error rate and the ratio of Gl to the bit length (bl) at a linear density of 2500 kfci.

In addition, in the magnetic recording and reproducing device including the differential read head 20 of the first embodiment, the dependency of the bit error rate on Gl/bl is hardly dependent on the linear density. FIG. 10 shows the relationship between Gl/bl and the bit error rate (BER) at a liner density of 2500 kfci in the magnetic recording and reproducing device. As shown in FIG. 10, the bit error rate is $10^{-7}$ or less in the range of Gl/Bl between 0.5 and 1.7, which is substantially equal at the linear density of 1500 kfci. The bit error rate of the shield-type read head is $10^{-3.0}$, because the resolution is significantly reduced in the shield-type read head. On the other hand, in the differential read head 20 of the first embodiment, Gl decreases along with the recording density, so that better bit error rate can be maintained without causing a reduction in the resolution.

From the above reasons, by controlling the ratio of the distance (Gl) between the first free layer 210 and the second free layer 310 to the bit length (bl), better bit error rate can be obtained even at high linear density, and high linear density can be achieved.

Figure 11:
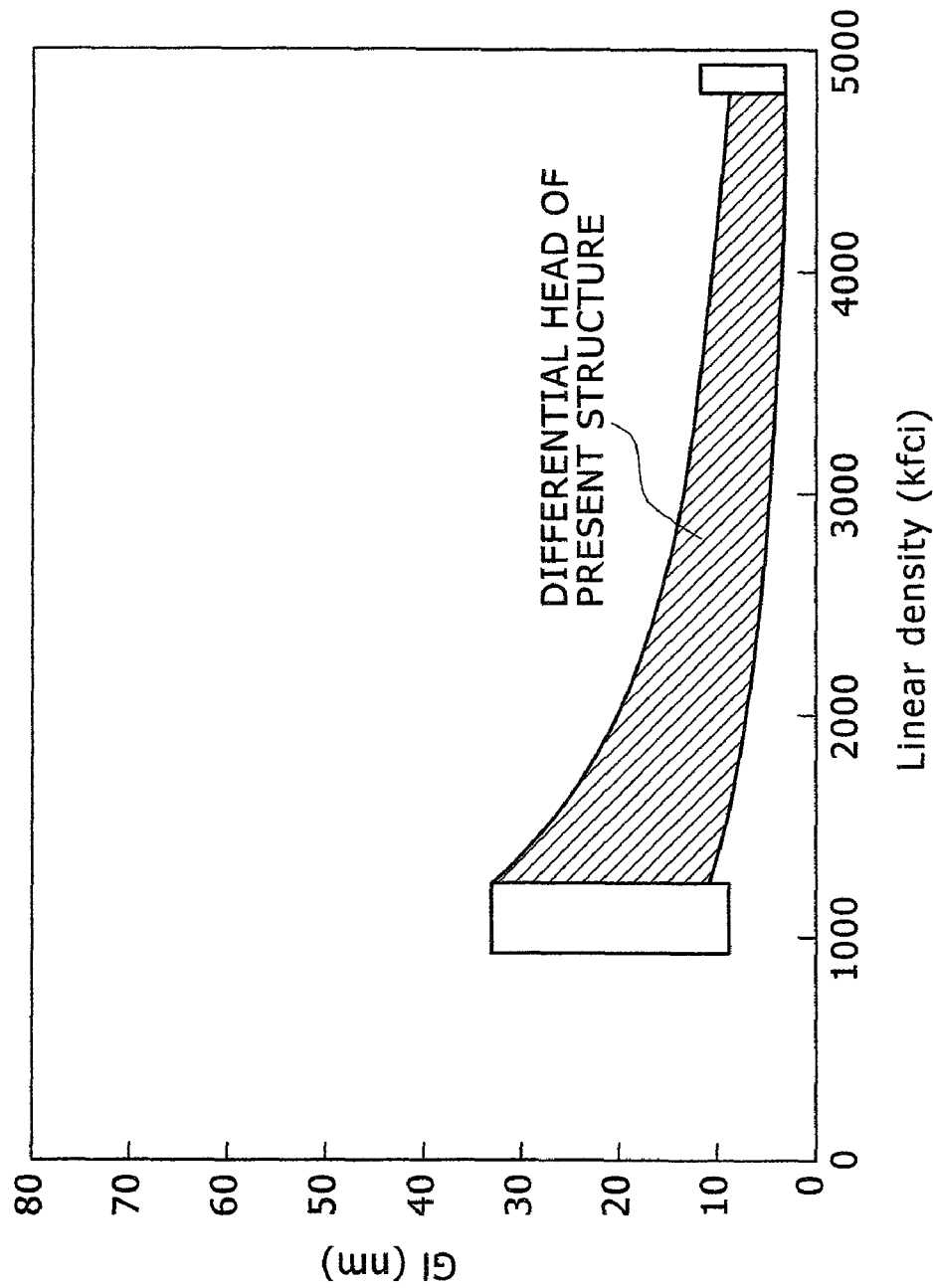
FIG. 11 is a graph showing the relationship between the linear density and Gl to be set in the present invention.

The following is a detailed configuration for setting an appropriate ratio of Gl to the bit length (bl) in the magnetic recording and reproducing device. FIG. 11 shows the relationship between Gl to be set in the configuration example of the first embodiment, and the maximum linear density (kfci) at which data is physically recorded on the magnetic recording media. The range of Gl shown in FIG. 11 can be easily obtained from equation (1). In general, the recording density of the magnetic recording and reproducing device is determined by multiplying the user data linear density (BIP), which is the linear density that a user can actually use, by the track density (TPI). For example, in the case of the magnetic recording and reproducing device with a surface density of 500 Gb/in2, the user data linear density is 1415 kbpi and a track density is 353 ktpi. The bit length (bl) can be determined from the user data linear density of the magnetic recording and reproducing device and the code rate, using the following equation (2).

$$bl=1/(BIP/\text{code rate}) \qquad (2)$$

Figure 12:
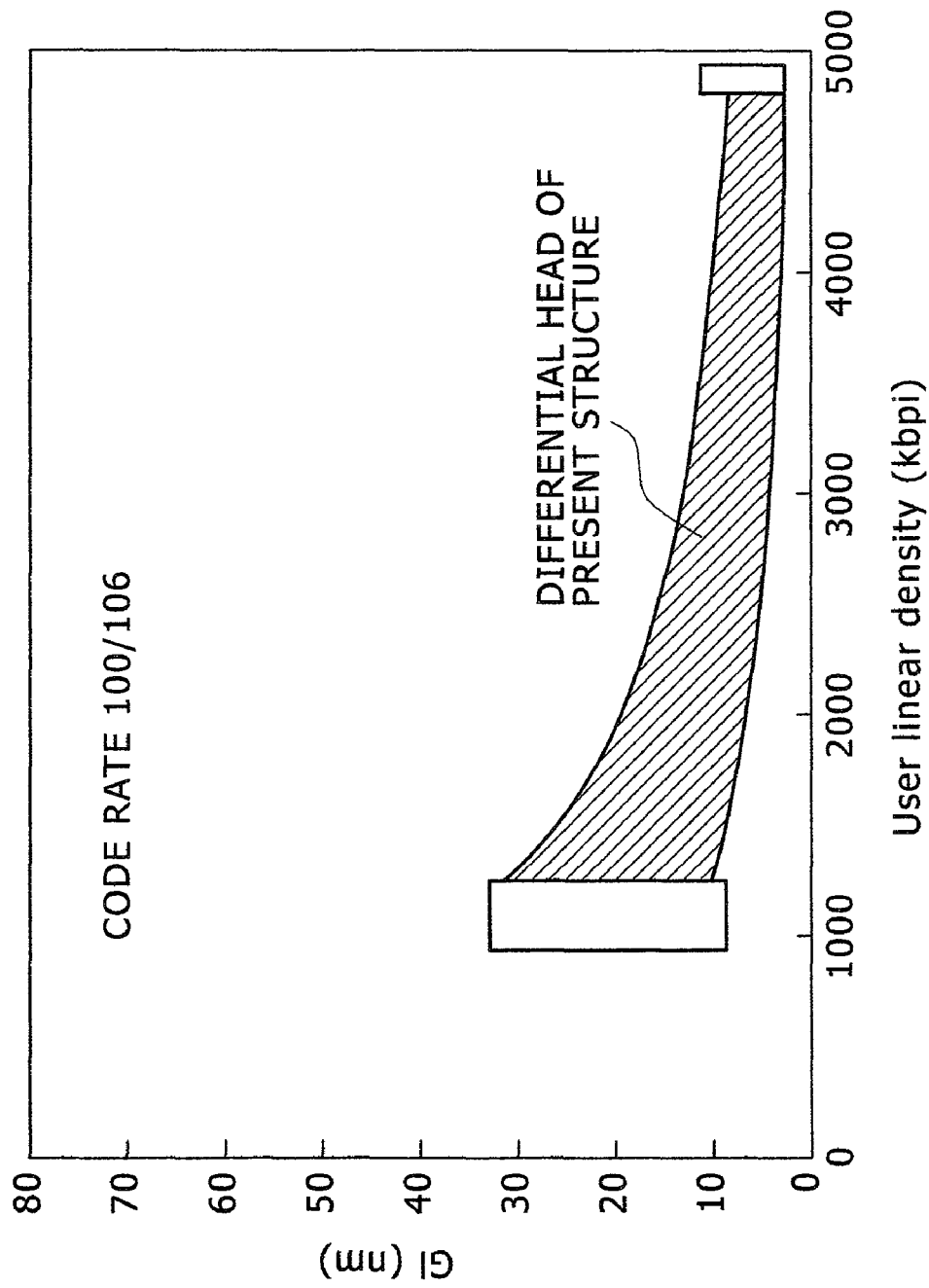
FIG. 12 is a graph showing the relationship between the user liner density and Gl to be set in the present invention, when the code rate is 100/106.
Figure 13:
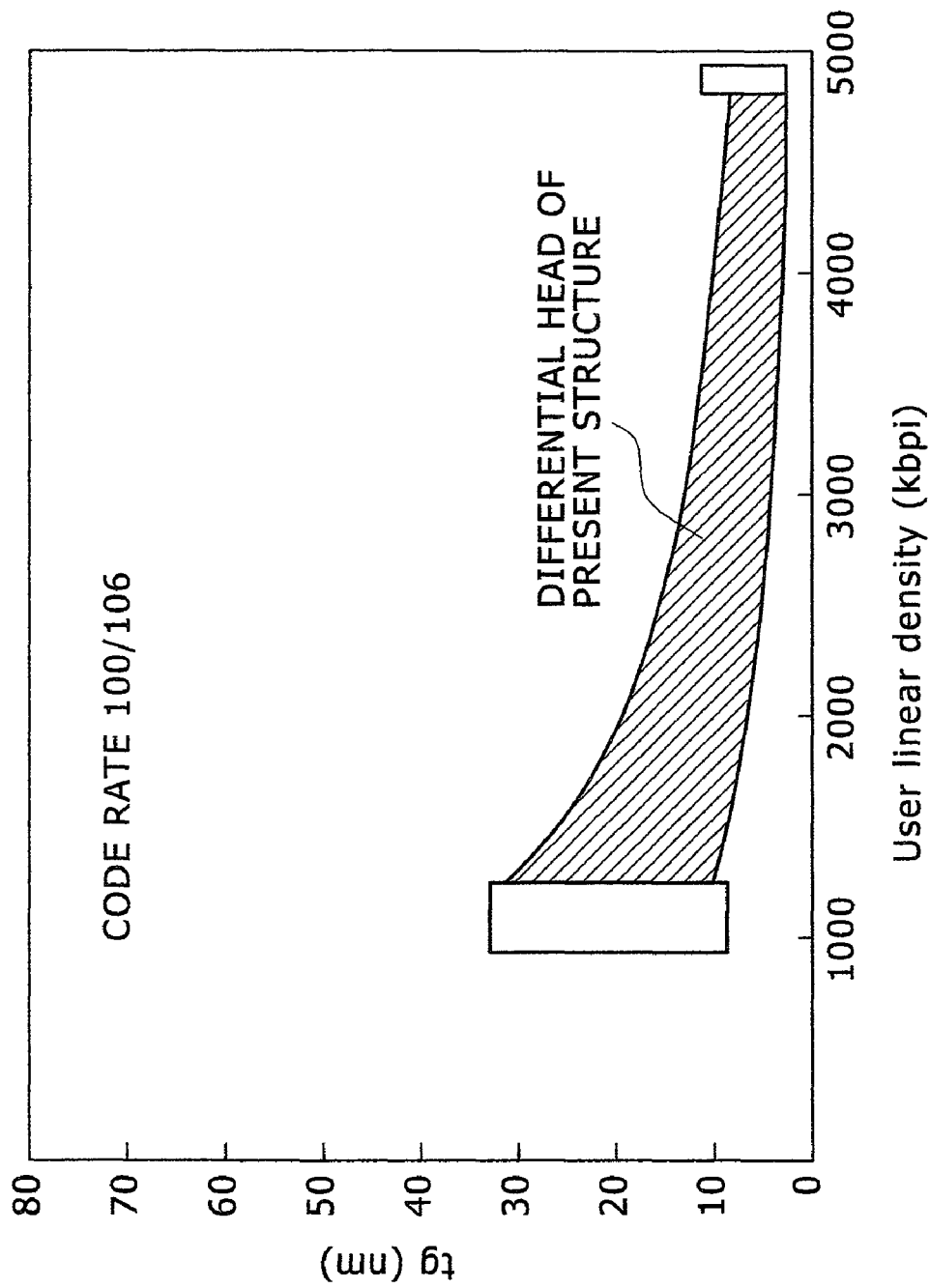
FIG. 13 is a graph showing the relationship between the user linear density and the layer thickness tg of a differential gap layer 100 to be set in the present invention, when the code rate is 100/106.

Here, the code rate indicates the ratio between the user data linear density and the maximum linear density (kfci) at which data is physically recorded on the magnetic recording media. For example, in the case of the magnetic recording and reproducing device with the user data linear density of 1415 kbpi and the code rate of 100/106, the maximum linear density at which data is physically recoded on the magnetic recording media is 1500 kfci. At this time, the bit length (bl) is 17 nm. In general, any value of one or more can be given to the code rate. The effect of the present invention will not be impaired by the value of the code rate. FIG. 12 shows the range of Gl necessary to achieve an arbitrary user data linear density (kbpi) in the magnetic recording and reproducing device including the differential read head 20 of the first embodiment. The code rate is set to 100/106. Further, FIG. 13 shows the relationship between the user data linear density (kbpi) and the layer thickness tg of the differential gap layer 100 in this configuration example. The value of Gl to be set in this configuration example is equal to the layer thickness tg of the differential gap layer 100.

Next, a description will be given of the specific composition and layer thickness of each component of the differential read head 20 shown in FIGS. 2 and 5. In the present invention, there is no particular limitation with respect to the lower magnetic shield 30, the upper magnetic shield 31, and insulating layer 40. Examples of commonly used materials are as follows. AlTiC, SiC, or those coated with $Al_2O_3$ for the substrate 15. A single layer film of Ni—Fe alloy or a nitride thereof, Co—Zr or Co—Hf or Co—Ta based amorphous alloy, or a multilayer film thereof for the lower magnetic shield 30 and the upper magnetic shield 31. It is convenient to use the sputtering method or plating method for film formation. For the insluting layer 40, $Al_2O_3$, $SiO_2$, AlN, SiN, or a mixture thereof, or a multilayer film thereof, can be used to prevent short-circuiting between the lower magnetic shield 30 and the upper magnetic shield 31. It is preferable to use the sputtering method that is convenient for film formation.

The sputtering method is preferred for forming the first magnetoresistive layer 200/differential gap layer 100/second magnetoresistive layer 300, from the viewpoint of the controllability of layer thickness and alloy composition as well as the mass production efficiency. A preferred configuration of the first magnetoresistive layer 200 is, for example, $Ni_{85}Fe_{15}$ (3)/$Co_{90}Fe_{10}$ (1)/MgO (1)/$Co_{90}Fe_{10}$ (2.5)/Ru (0.45)/$Co_{90}Fe_{10}$ (4)/Ru (0.45)/$CO_{75}Fe_{25}$ (1.5)/$Mn_{80}Ir_{20}$ (6). The numbers in parenthesis indicate the layer thickness in nm. The unit of each alloy composition indicated by the corresponding element suffix is at %. In this configuration example, $Mn_{80}Ir_{20}$ (6) corresponds to the first anti-ferromagnetic layer 236, $Co_{75}Fe_{25}$ (2)/Ru (0.45)/$Co_{90}Fe_{10}$ (2.5)/Ru (0.45)/$Co_{90}Fe_{10}$ (2.5) corresponds to the first pinned layer 230, MgO (1) corresponds to the first intermediate layer 220, and $Co_{90}Fe_{10}$ (1)/$Ni_{85}Fe_{15}$ (3) corresponds to the first free layer 210, respectively. Incidentally, Ta (3)/Ru (2) may be formed as a foundation layer of the first anti-ferromagnetic layer 236. Here, an example of using MgO to form a TMR layer is shown as the first intermediate layer. However, in addition to MgO, an oxide containing Mg, Al, Si, Ti, V, Mn, Zr, Nb, Hf, Ta, and the like, or a nitride thereof, may also be used as the intermediate layer material. When the first intermediate layer is configured with Cu, Ag, Au, or an alloy mainly containing such elements, the configuration can be used as it is as a CPP-GMR layer. Further, the first intermediate layer may have a so-called "current confinement" structure in which a conduction path is formed with a pinhole of metal such as Cu in an insulating material such as $Al_2O_3$.

Similarly, a preferred configuration of the second magnetoresistive layer 300 is, for example, $Ni_{85}Fe_{15}$ (3)/$Co_{90}Fe_{10}$ (1)/MgO (1)/$Co_{90}Fe_{10}$ (2.5)/Ru (0.45)/$Co_{90}Fe_{10}$ (3)/$Mn_{80}Ir_{20}$ (6). The second magnetoresistive layer 300 is configured so that the stacking order of the layers constituting the first magnetoresistive layer 200 is substantially reversed. With this configuration, it is possible to obtain substantially the same magnetoresistance change characteristics. The major way for fine adjustment of the sheet resistance and the magnetic resistance ratio is to optimize the layer thickness of the intermediate layer accordingly. The only difference is in the configuration of the pinned layer. The second pinned layer 330 of the second magnetoresistive layer 300 is defined as $Co_{90}Fe_{10}$ (2.5)/Ru (0.45)/$Co_{90}Fe_{10}$ (3). The two pinned layers have the so-called synthetic-ferri structure, in which the Co—Fe ferromagnetic layer and the Ru layer producing an anti-ferromagnetic interlayer coupling are alternately laminated. The difference is in that the first pinned layer 230 of the first magnetoresistive layer 200 includes a three-layered Co—Fe layer, while the second pinned layer 330 of the second magnetoresistive layer 300 includes a two-layered Co—Fe layer. In other words, the first pinned layer 230 has a synthetic-ferri structure in which m ferromagnetic layers (where m is an odd number) and m−1 anti-ferromagnetic interlayer coupling layers are alternately laminated, while the second pinned layer 330 has a synthetic-ferri structure in which n ferromagnetic layers (where n is an even number) and n−1 anti-ferromagnetic interlayer coupling layers are alternately laminated.

With this configuration, the magnetizations of the ferromagnetic layers (the components of the first pinned layer 230 and the second pinned layer 330) respectively contacting the first anti-ferromagnetic layer 236 and the second anti-ferromagnetic layer 334, are fixed in one direction. At this time, the magnetizations of the ferromagnetic layers (the components of the first pinned layer 230 and the second pinned layer 330) respectively contacting the first intermediate layer 220 and the second intermediate layer 320, which effectively contribute to the magnetoresistive effect, are fixed in the anti-parallel direction. As a result, the first magnetoresistive layer 200 and the second magnetoresistive layer 300 show the resistance change characteristics of opposite phase to the signal field in one direction. The effect of the present invention will not be impaired if m is an even number and n is an odd number.

A specific example of the composition of the differential gap layer 100 is Cr, Cu, Pd, Ag, Ir, Pt, Au, Mo, Ru, Rh, Ta, W, Pr, Nd, Sm, Eu, Gd, Tb, Dy, Ho, or Er, or an alloy containing such elements. It should be noted that the composition is based on a material selected so as not to generate magnetoresistive effect between the first and second free layers 210, 310 via the differential gap layer 100. The metals that can be used for the differential gap layer 100, can be classified into the following three major groups: A (Cr, Cu, Pd, Ag, Ir, Pt, Au); B (Mo, Ru, Rh, Ta, W); and C (Pr, Nd, Sm, Eu, Gd, Tb, Dy, Ho, Er). The differential read head using any of the metals of Group A has characteristics that the electrical resistance is lower than the other metals of Group B or C. The metals of Group B have characteristics that the resistance to physical polishing is greater than the other metals of Group A or C. The metals of Group C have characteristics that the spin-torque noise caused by spin torque is smaller than the other metals of Group A or B. These elements can be appropriately selected in accordance with the recording density of the magnetic recording and reproducing device, which is the track width of the differential read head, the element size such as Gl, and the electrical resistance.

As described above, with the magnetic recording and reproducing device of the first embodiment, it is possible to maintain high resolution and high reproduction output, even if the bit length is reduced, in other words, the linear density increases. Since the reproduction output can be kept high, SNR can also be increased. Further, because the magnetic recording read head is mounted on the magnetic recording and reproducing device, it can obtain a necessary bit error rate and achieve a high linear density.

Next, in the magnetic recording and reproducing device including the magnetic recording read head of the first embodiment, a better bit error rate (BER) can be stably obtained by setting the ratio of the inside distance (Gl) between the two free layers in the differential read head, to the bit length (Bl) to a range satisfying the following equation (3).

$$0.8 < Gl/bl < 1.4 \quad (3)$$

Figure 14:
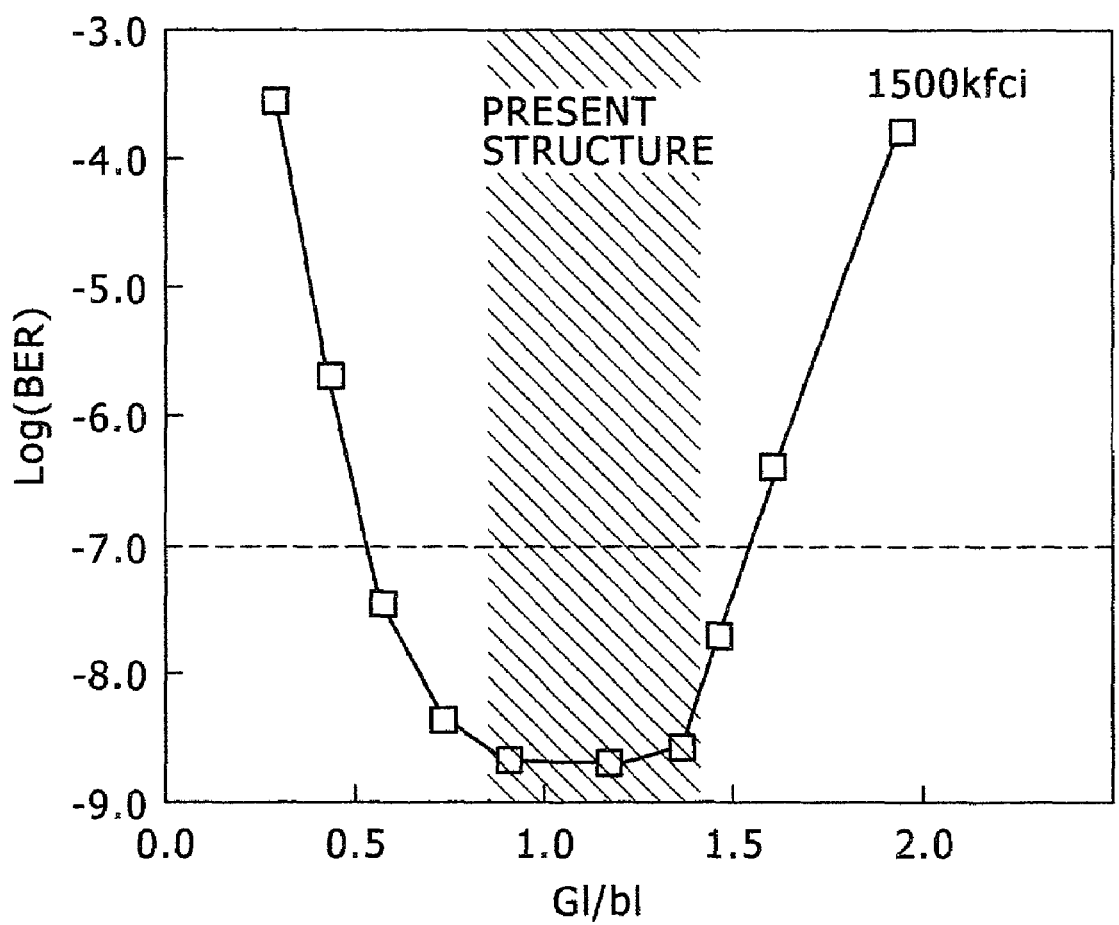
FIG. 14 is a graph showing the relationship between the bit error rate and the ratio of Gl to the bit length (bl) according to the present invention, at a linear density of 1500 kfci.
Figure 15:
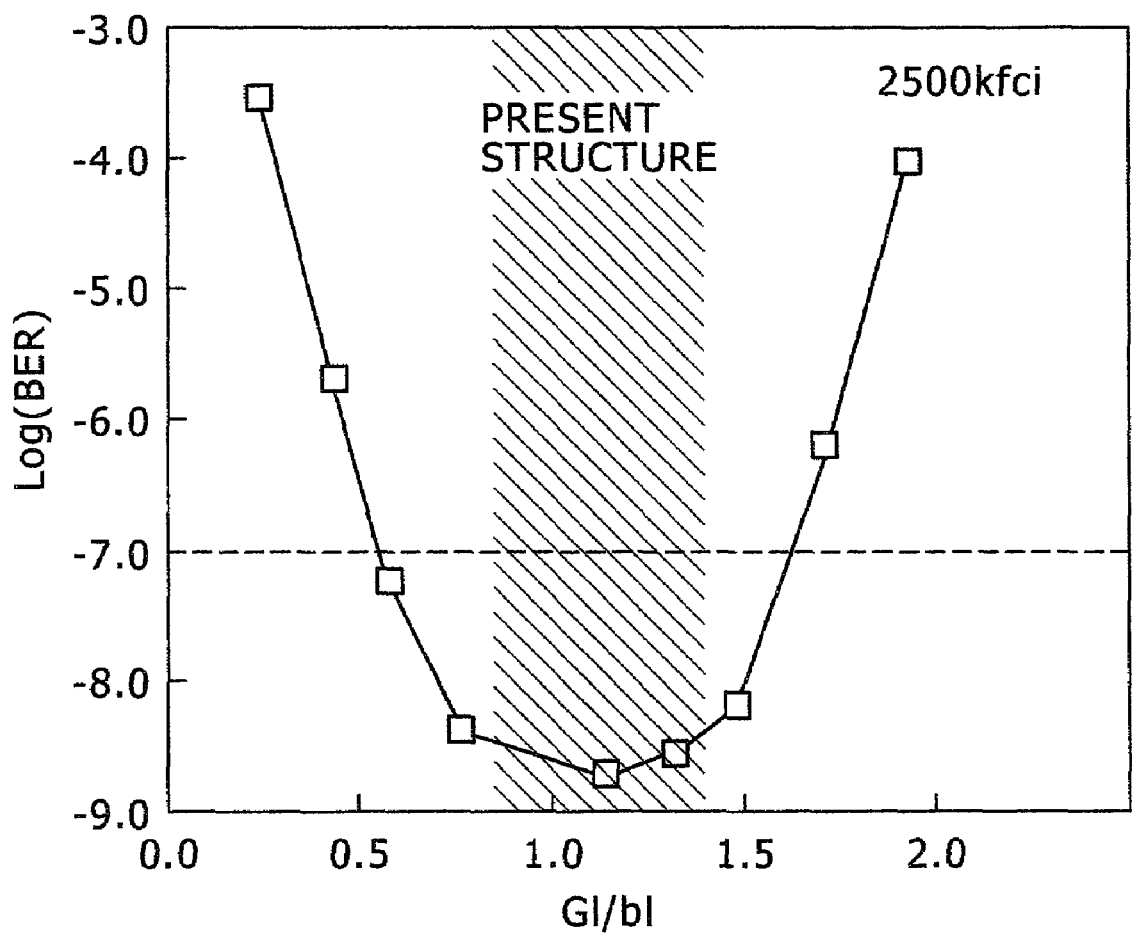
FIG. 15 is a graph showing the relationship between the bit error rate and the ratio of Gl to the bit length (bl) according to the present invention, at a linear density of 2500 kfci.

FIG. 14 shows the relationship between the bit error rate (BER), and the ratio (Gl/bl) of the inside distance (Gl) between the two free layers to the bit length (bl), in the magnetic recording and reproducing device in the range described above. The linear density is set to 1500 kfci. Similarly, FIG. 15 shows the relationship between the bit error rate (BER), and the ratio (Gl/bl) of the inside distance (Gl) between the two free layers to the bit length (bl), at a linear density of 2500 kfci. As apparent from FIGS. 14 and 15, a better bit error rate can be achieved in this range than in the range defined by equation (1), independent of the linear density. Further, a better bit error rate can be stably obtained in this range than in the range of the first embodiment, even if the ratio (Gl/bl) of the inside distance (Gl) between the two free layers to the bit length (bl) varies. As a result, the margin of the magnetic recording and reproducing device increases.

Second Embodiment

Figure 16:
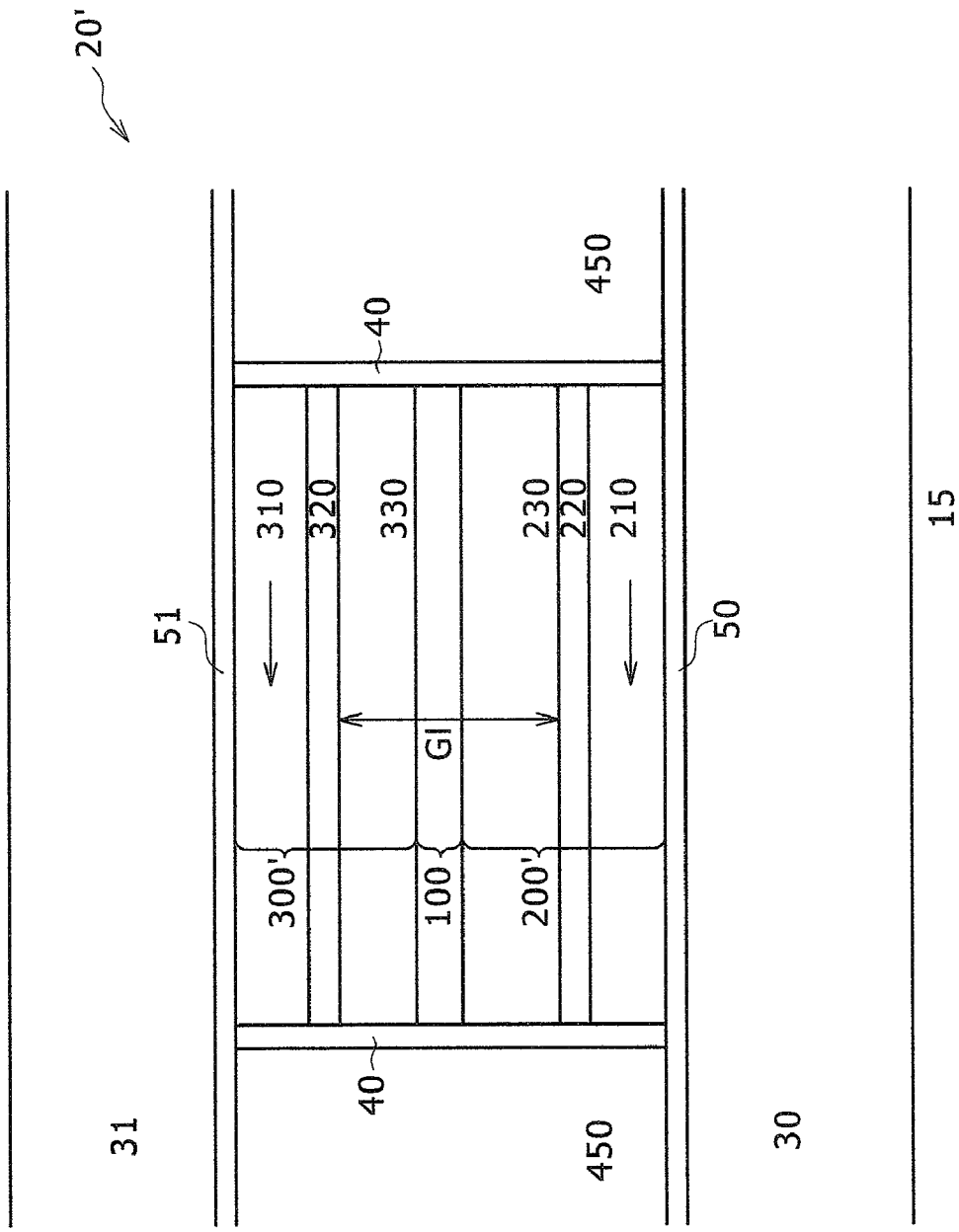
FIG. 16 is a schematic diagram of the differential read head according to a second embodiment, as seen from the ABS side.

FIG. 16 shows the configuration of a differential read head 20' according to a second embodiment. This configuration example differs from the first embodiment only in the configuration of the differential read head. Thus, a repeated description of the magnetic recording read head and the magnetic recording and reproducing device is omitted, except for the description of the differential read head. In this configuration example, the first free layer 210 and first pinned layer 230 of the first embodiment are replaced with each other, and the second free layer 310 and second pinned layer 330 of the first embodiment are replaced with each other. Also in this configuration example, as described in the first embodiment, the ratio of the inside distance (Gl) between the two free layers to the bit length (bl), in itself should be appropriately set. The range of the ratio (Gl/bl) is the same as the range given by equation (1) shown in the first embodiment. Naturally, in the magnetic recording and reproducing device including the differential read head 20', Gl and the maximum linear density (kfci) satisfy the relationship shown in FIG. 11. In addition, it is obvious that when the code rate is set to 100/106 similarly to the first embodiment, the relationship between the user liner density (kbpi) and Gl satisfies the relationship shown in FIG. 12. However, Gl is equal to the layer thickness of the differential gap layer 100 in the first embodiment, while in this configuration example Gl is the sum of the layer thickness of the differential gap layer 100, and the layer thicknesses of the first and second pinned layers 230, 330. Thus, in this configuration example, the sum of the layer thickness tg of the differential gap layer 100, the layer thickness tp1 of the first pinned layer 230, and the layer thickness tp2 of the second pinned layer 330 should be smaller than Gl given by equation (1) and should satisfy the following equation (4):

$$tp1 + tp2 + tg < Gl \quad (4)$$

Figure 17:
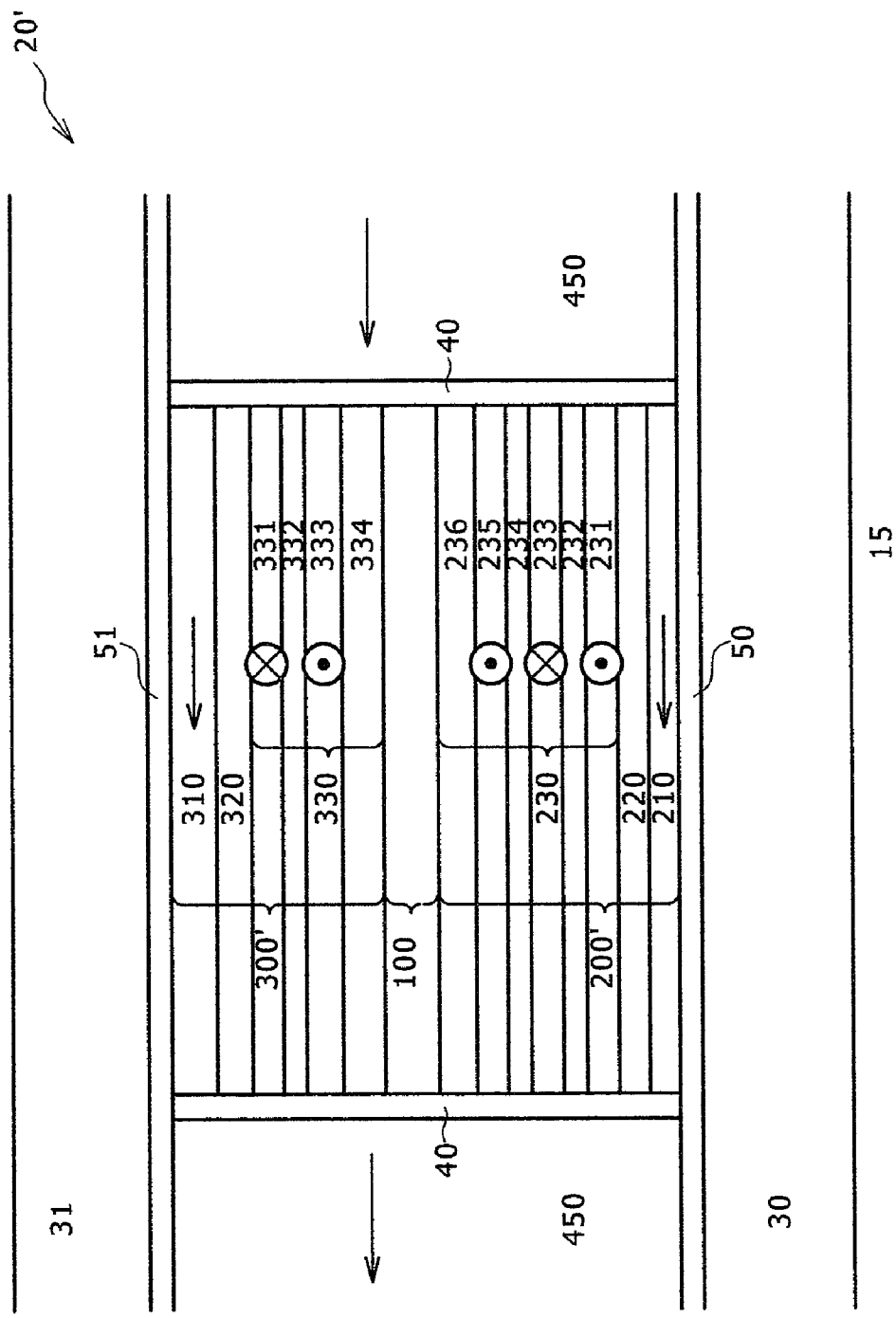
FIG. 17 is a detailed block diagram of the differential read head shown in FIG. 16.

FIG. 17 shows an example of the detailed configuration of the differential read head 20'. A preferred configuration of a first magnetoresistive layer 200' is, for example, $Mn_{80}Ir_{20}$ (6)/$CO_{75}Fe_{25}$ (1.5)/Ru (0.45)/$Co_{90}Fe_{10}$ (4)/Ru (0.45)/$Co_{90}Fe_{10}$ (2.5)/MgO (1)/$Co_{90}Fe_{10}$/$Ni_{85}Fe_{15}$ (3) in this order from the side of the differential gap layer 100. A preferred configuration of a second magnetoresistive layer 300' is, for example, $Ni_{85}Fe_{15}$ (3)/$Co_{90}Fe_{10}$ (1)/MgO (1)/$Co_{90}Fe_{10}$ (3.0)/Ru (0.45)/$Co_{90}Fe_{10}$ (2.5)/$Mn_{80}Ir_{20}$ (6) in this order from the side of the upper electrode 51. In the configurations described above as an example, the layer thickness tp1 of the first pinned layer film is 14.9 nm, and the layer thickness tp2 of the second pinned layer is 11.95 nm.

Figure 18:
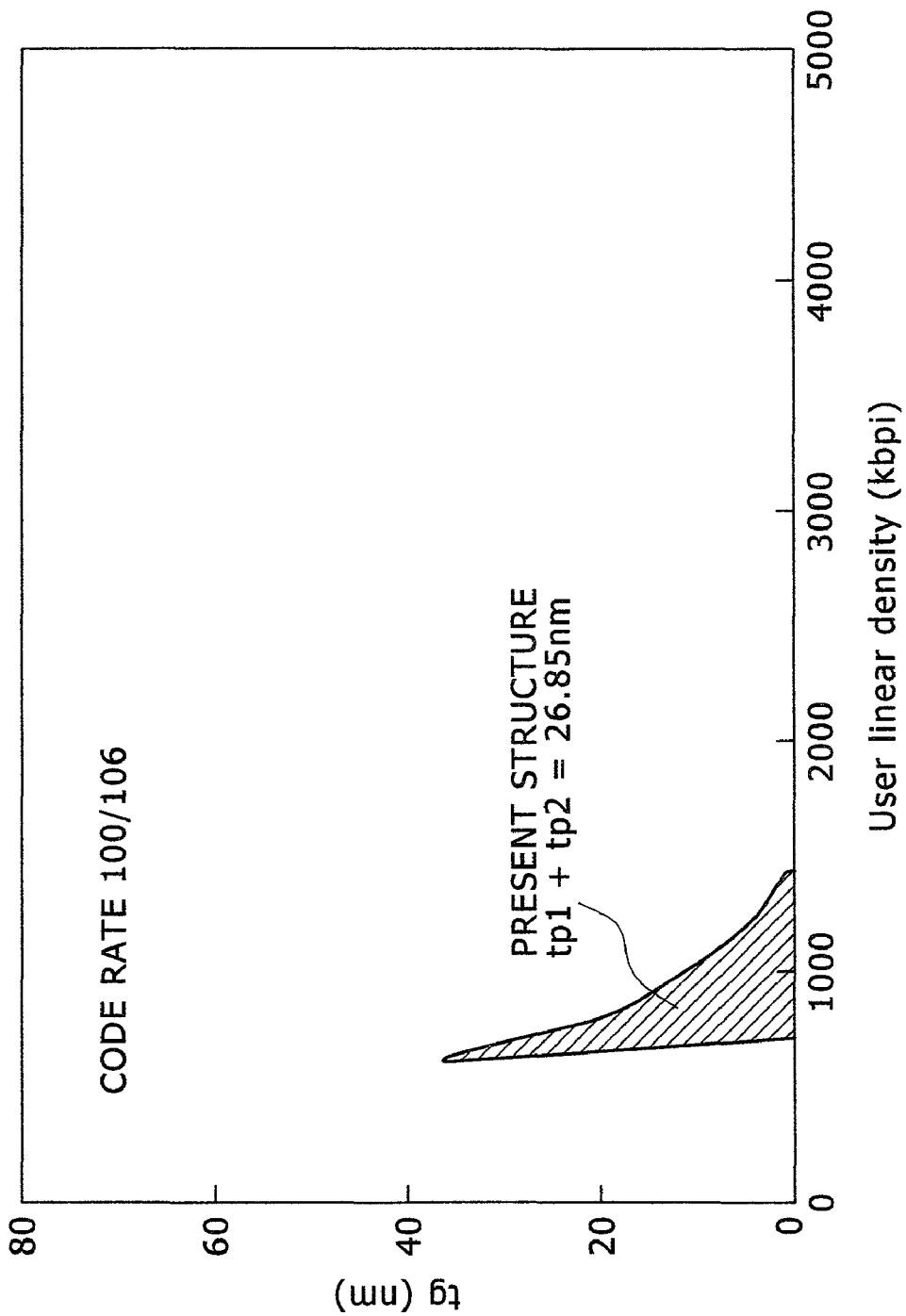
FIG. 18 is a graph showing the relationship between the user linear density and the layer thickness tg of the differential gap layer to be set in the second embodiment, when the sum of the first pinned layer thickness tp1 and the second pinned layer thickness tp2 is 26.85 nm with a code rate of 100/106.

FIG. 18 shows an example of the range of the layer thickness tg of the differential gap layer 100 that satisfies equations (1) and (3) in this configuration example. As shown in the figure, the layer thickness tg of the differential gap layer 100 is negative at a user linear density of 1400 kbpi or more, and it is difficult to achieve a higher linear density. Thus, in order to satisfy equation (3), it is necessary to reduce both the layer thickness tp1 of the first pinned layer 230 and the layer thickness tp2 of the second pinned layer 330. A preferred layer configuration of the first magnetoresistive layer 200' with a thinner pinned layer is, for example, $Mn_{80}Ir_{20}$ (4)/$Co_{75}Fe_{25}$ (1.0)/Ru (0.45)/$Co_{90}Fe_{10}$ (2.0)/Ru (0.45)/$Co_{90}Fe_{10}$ (1.0)/MgO (1)/$Co_{90}Fe_{10}$/$Ni_{85}Fe_{15}$ (3) in this order from the side of the differential gap layer 100. A preferred layer configuration of the second magnetoresistive layer 300' with a thinner pinned layer is, for example, $Mi_{85}Fe_{15}$ (3)/$Co_{90}Fe_{10}$ (1.5)/MgO (1)/$Co_{90}Fe_{10}$ (1.5)/Ru (0.45)/$Co_{90}Fe_{10}$ (1.0)/$Nn_{80}Ir_{20}$ (4) in this order from the side of the upper electrode 51.

Figure 19:
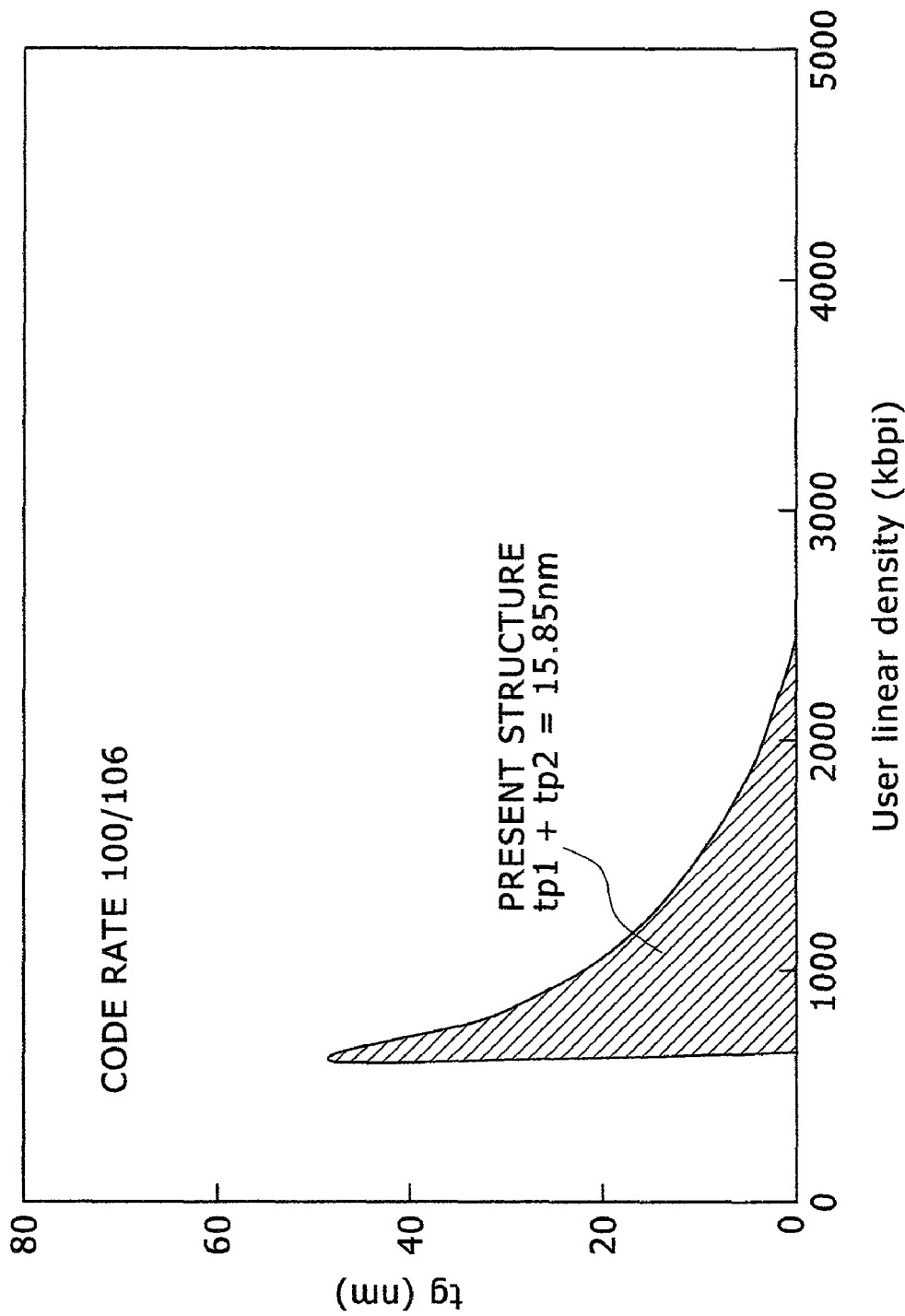
FIG. 19 is a graph showing the relationship between the user linear density and the layer thickness tg of the differential gap layer to be set in the second embodiment, when the sum of the first pinned layer thickness tp1 and the second pinned layer thickness tp2 is 15.85 nm with a code rate of 100/106.

In this layer configuration example, tp1 is 9.9 nm and tp2 is 6.95 nm. FIG. 19 shows an example of the range of the layer thickness tg of the differential gap layer 100, which satisfies equations (1) and (3) in this configuration example. As shown in the figure, the user linear density of 2400 kbpi can be achieved by reducing the layer thickness of the pinned layers. The total layer thickness of the pinned layers (tg1+tg2) can also be reduced by reducing the number of layers constituting the respective pinned layers, so that much higher user linear density can be expected. As described above, also in this configuration example with the layer structure designed to have an appropriate relationship between the bit length and Gl, it is possible to obtain a bit error rate sufficient for the magnetic recording and reproducing device even at a high linear density. Further, in this configuration example, the layer thickness tg of the differential gap layer 100 is made thinner than that of the first embodiment. With this layer structure, it is possible to reduce costs without increasing the number of film formation processes. There is no problem in this configuration example if the ratio (Gl/bl) between Gl to be set and the bit length is in the range given by equation (3) of the first embodiment.

Third Embodiment

Figure 20:
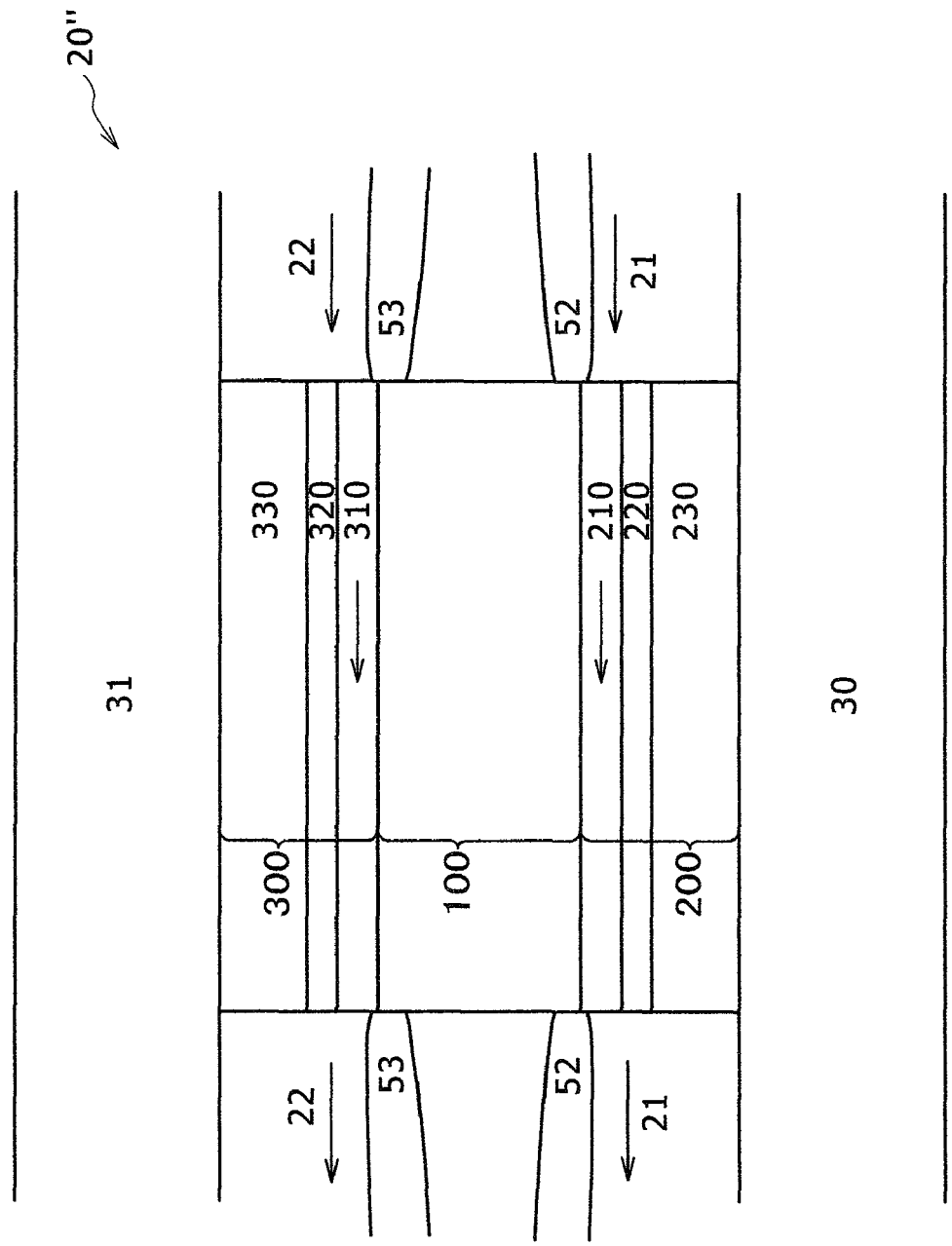
FIG. 20 is a schematic diagram of a differential read head according to a third embodiment, as seen from the ABS side.

The configuration of a differential read head 201" of a third embodiment is different from the configuration of the first embodiment in the direction of current flowing through the differential read head. The configuration of the magnetic recording read head and the magnetic recording and reproducing device, except for the differential read head, is the same as that of the first embodiment, and the description is omitted. FIG. 20 shows the differential read head in this configuration example. Unlike the configuration of the first embodiment, there is no need to have the under electrode 50 and the upper electrode 51 in this configuration example. Instead, a first electrode 52 and a second electrode 53 are independently provided in the respective ends of the first magnetoresistive layer 200 and the second magnetoresistive layer 300 in the track width direction. Along with this, a first permanent magnetic layer 21 is provided on the outside of the first magnetoresistive layer 200 in the track width direction, and a second permanent magnetic layer 22 is provided on the outside of the second magnetoresistive layer 300 in the track width direction. Here, in order to cause current to independently flow through the two magnetoresistive layers, the layer thickness of the differential gap layer 100 should be large enough compared to the layer thickness of the insulating layer or magnetoresistive layers. The material of the differential gap layer 100 is not particularly limited to a specific one. For example, such materials as $Al_2O_3$, $SiO_2$, AlN, SiN, or a mixture thereof, or a multilayer film thereof, are commonly used for the differential gap layer 100. This configuration example is designed to obtain the same effect as in the configuration example of the first embodiment in terms of characteristics of differential waveform, output, resolution, and SNR, by independently flowing current of the same polarity through the first magnetoresistive sensor 200 and the second magnetoresistive sensor 300, and by synthesizing the output voltages of the two magnetoresistive sensors in series. Thus, similarly to the embodiments 1 and 2, the magnetic recording and reproducing device including the differential read head 20" of this embodiment can also obtain a better bit error rate by appropriately setting Gl and the bit length even at a high linear density.

What is claimed is:

1. A magnetic recording and reproducing device comprising:
    a perpendicular recording media having a perpendicular magnetization layer;
    means for rotating the perpendicular recording media;
    a magnetic recording read head having a read head, and a perpendicular write head disposed adjacent to the read head; and
    means for processing signals to be written or read to the perpendicular recording media by the magnetic recording read head,
    wherein the read head has a multilayer structure formed by laminating a first magnetoresistive sensor having a first free layer, a differential gap layer, and a second magnetoresistive sensor having a second free layer in this order from a substrate side, the read head also having a pair of electrodes provided on an outward layer of the multilayer structure and a pair of magnetic shields provided on the outside of the respective electrodes,
        wherein the first and second magnetoresistive sensors have resistance changes of opposite phase to a magnetic field in one direction, thereby enabling differential operation,
    wherein the perpendicular write head has a main pole and a return pole, and
    wherein the processed signals have a bit length set to have a ratio of the inside distance between the first and second free layers to said bit length which is 0.6 or more and 1.6 or less,
    wherein each of the pair of magnetic shields is formed via each of the pair of electrodes on the outward layer of the multilayer structure of the read head, and
    wherein waveforms of a single output of the first magnetoresistive sensor and a single output of the second magnetoresistive sensor are rectangular reproduction waveforms having said bit length.

2. The magnetic recording and reproducing device according to claim 1,
    wherein a ratio of the inside distance between the first and second free layers to the bit length is 0.8 or more and 1.4 or less.

3. The magnetic recording and reproducing device according to claim 1,
    wherein the pair of magnetic shields also serves as the pair of electrodes.

4. A magnetic recording and reproducing device comprising:
    a perpendicular recording media having a perpendicular magnetization layer;
    means for rotating the perpendicular recording media;
    a magnetic recording read head having a read head, and a perpendicular write head disposed adjacent to the read head; and means for processing signals to be written or read to the perpendicular recording media by the magnetic recording read head, wherein the read head has a multilayer structure formed by laminating a first magnetoresistive sensor having a first free layer, a differential gap layer, and a second magnetoresistive sensor having a second free layer in this order from a substrate side, the read head also having two pairs of electrodes provided on both sides of the multilayer structure to cause current to independently flow in a film surface direction of the first and second magnetoresistive sensors, as well as a pair of magnetic shields provided on the outside of the multilayer structure, wherein the first and second magnetoresistive sensors have resistance changes of opposite phase to a magnetic field in one direction, thereby enabling differential operation, wherein the perpendicular write head has a main pole and a return pole, and wherein the processed signals have a bit length set to have a ratio of the inside distance between the first and second free layers to said bit length which is 0.6 or more and 1.6 or less, wherein each of the pair of magnetic shields is formed an outward layer of the multilayer structure of the read head, and wherein waveforms of a single output of the first magnetoresistive sensor and a single output of the second magnetoresistive sensor are rectangular reproduction waveforms having said bit length.

5. The magnetic recording and reproducing device according to claim 4, wherein a ratio of the inside distance between the first and second free layers to the bit length is 0.8 or more and 1.4 or less.

* * * * *